(12) United States Patent
Error

(10) Patent No.: US 8,341,259 B2
(45) Date of Patent: Dec. 25, 2012

(54) ASP FOR WEB ANALYTICS INCLUDING A REAL-TIME SEGMENTATION WORKBENCH

(75) Inventor: Brett M. Error, Orem, UT (US)

(73) Assignee: Adobe Systems Incorporated, San Jose, CA (US)

( * ) Notice: Subject to any disclaimer, the term of this patent is extended or adjusted under 35 U.S.C. 154(b) by 390 days.

(21) Appl. No.: 11/422,129

(22) Filed: Jun. 5, 2006

(65) Prior Publication Data

US 2007/0011304 A1    Jan. 11, 2007

Related U.S. Application Data

(60) Provisional application No. 60/688,167, filed on Jun. 6, 2005.

(51) Int. Cl.
*G06F 15/173* (2006.01)
(52) U.S. Cl. .................................................. 709/224
(58) Field of Classification Search .................. 709/223, 709/224
See application file for complete search history.

(56) References Cited

U.S. PATENT DOCUMENTS

| 6,285,997 B1 * | 9/2001 | Carey et al. ............................ 1/1 |
| 2003/0154442 A1 * | 8/2003 | Papierniak .................. 715/501.1 |
| 2005/0262240 A1 * | 11/2005 | Drees et al. .................... 709/224 |

OTHER PUBLICATIONS

How ASPs Deliver Value: Next Generation Portals for Business Applications, Giotto Perspectives, Giotto ASP White Paper, 7 pages, May 3, 1999, [online] [Retrieved on Jan. 24, 2006] Retrieved from the Internet <URL:http://www.trginternational.comHTML/giotto.htm>.
International Search Report and Written Opinion, PCT/US06/21977, Jun. 19, 2008, 8 pages.
Search Report from European Application No. 06772335.3-2201 / 1894121 (PCT/US2006021977), mailed on May 19, 2010, 7 pages.
English Translation of Office Action from Japanese Patent Application No. P2008-514974, dated Nov. 14, 2011, Adobe Systems Incorporated, 3 pages.
Office Action from Japanese Patent Application No. P2008-514974, dated Nov. 14, 2011, Adobe Systems Incorporated, 3 pages.
"Access Log Analysis Tool & Service Guide)", iNTERNET magazine, 2nd Stage, p. 114-115, published by Kabushikikaisha Inpress, Japan, Jan. 1, 2005, 2 pages—no translation available.

* cited by examiner

*Primary Examiner* — Scott Christensen
(74) *Attorney, Agent, or Firm* — Robert C. Kowert; Meyertons, Hood, Kivlin, Kowert & Goetzel, P.C.

(57) ABSTRACT

An application service provider system for retrieving and displaying web analytic data, or segmentation workbench, comprises a server and several client computing devices. The server includes a web analytics tool. Each of the clients preferably includes a web analytics client for communication with the server. The application service provider system is architecture allows web analytics service to be provided to users with an application service provider where the web traffic information for different users can be segregated and share a single server while communicating with different clients of different user companies. The present invention also includes a number of methods for retrieving and presenting web analytics data.

29 Claims, 28 Drawing Sheets

Open Project

Look in: 📁 My Projects ▽

| Name ▽ | Report Suite | Data Date Range | Last Modified |
|---|---|---|---|
| Holiday Analysis | ACME Germany | Dec 2004 | 2005-02-01 |
| Spring Sales | ACME Japan | Mar 2005 | 2005-04-03 |

File name: [          ]

[ Open ] [ Cancel ]

---

Open Project

Look in: 📁 Shared Projects ▽

| Name ▽ | Report Suite | Data Date Range | Owner |
|---|---|---|---|
| Holiday Analysis | ACME Germany | Dec 2004 | Suzy Que |
| Spring Sales | ACME Japan | Mar 2005 | Marty McFly |

File name: [          ]

[ Open ] [ Cancel ]

"ASP FOR WEB ANALYTICS INCLUDING A REAL-TIME SEGMENTATION WORKBENCH

CROSS REFERENCE TO RELATED APPLICATIONS

This application claims the benefit of U.S. Provisional Application No. 60/688,167, filed Jun. 6, 2005, entitled "ASP For Web Analytics Including A Real-Time Segmentation Workbench," by Brett M. Error, which is incorporated by reference in its entirety.

BACKGROUND OF THE INVENTION

1. Field of the Invention

This invention relates generally to systems and methods for web analytics. More particularly, the present invention relates to an application service provider system and methods for providing a segmentation workbench for manipulation and display of web traffic data on a real-time basis.

2. Description of the Related Art

Web analytics refers to the analysis of data created by website usage. For instance, web analytics can be used to mine visitor traffic data. A variety of visitor traffic data is measured such as what browser is being used, what links on a given web page were selected, whether a product was purchase, etc. There are number of web analytics tools presently available such as Site Catalyst version 11 from Omniture of Orem, Utah. These tools are able to capture data on website usage, and responsive to a user's request display a variety of different metrics on website usage such fallout/conversion, A/B testing, etc.

One prior art method for presenting web analytics data to the user is on-line reporting. While on-line reporting can provide data at relatively high speeds and has some presentation flexibility using an HTML format, it significantly limits the data that is available to the user. Typically, the data is provided by extracting data from a database using in a set number of pre-defined reports. The user's ability to segregate the data, produce different reports, and look at the data with different combinations of metrics is severely limited. Thus while the user is able to view data on web traffic, it is often not the data that is most valuable to the user. Therefore, the problem with such on-line systems is that the user does not have the flexibility to get the data they desire and based on different slices of a metric.

Another method for presenting web traffic data to the user is by providing access to the data warehouse or database. Such an approach gives the user the ability to slice and manipulate the data as they desire to provide the reports that are most valuable to them. Such direct access also provides them with the flexibility to answer any question about the data presented, such system are typically very complex and difficult to use. In many cases, despite the availability of general database tools and user interfaces, a non-technical user cannot interact, query and generated the reports needed. Typically, business users work with a database programmer to extract and format the data as needed from the data warehouses. Moreover, such systems can be slow when there are many users trying to access the same date warehouse.

Thus, there is a need for an application service provider model for providing a segmentation workbench for manipulation and display of web traffic data that solves the above shortcomings of the prior art such as real-time delivery of data.

SUMMARY OF THE INVENTION

The system of the present invention provides an application service provider system for retrieving and displaying web analytic data, or segmentation workbench. The present invention preferably comprises a server and several client computing devices. The server includes a web analytics tool. Each of the clients preferably includes a web analytics client for communication with the server. This architecture is particularly advantageous because the users are able to have rich functionality of a web analytics tool including the segmentation workbench and access to the data in real time. The application service provider system is architecture allows web analytics service to be provided to users with an application service provider where the web traffic information for different users can be segregated and share a single server while communicating with different clients of different user companies. The present invention also includes a number of methods for retrieving and presenting web analytics data.

THE BRIEF DESCRIPTION OF THE DRAWINGS

DETAILED DESCRIPTION OF THE EMBODIMENTS

The present invention provides an application service provider model for providing a segmentation workbench for manipulation and display of web traffic data on a real-time basis. The present invention advantageously combines the best features of on-line reporting systems and direct access to data warehouse with an application service provider segmentation workbench that: 1) provides fast access to the data in real time, 2) is easy for the user to manipulate and filter the data, and 3) is flexible and allows the user to present the data in numerous desired formats.

Basic System

Figure 1:
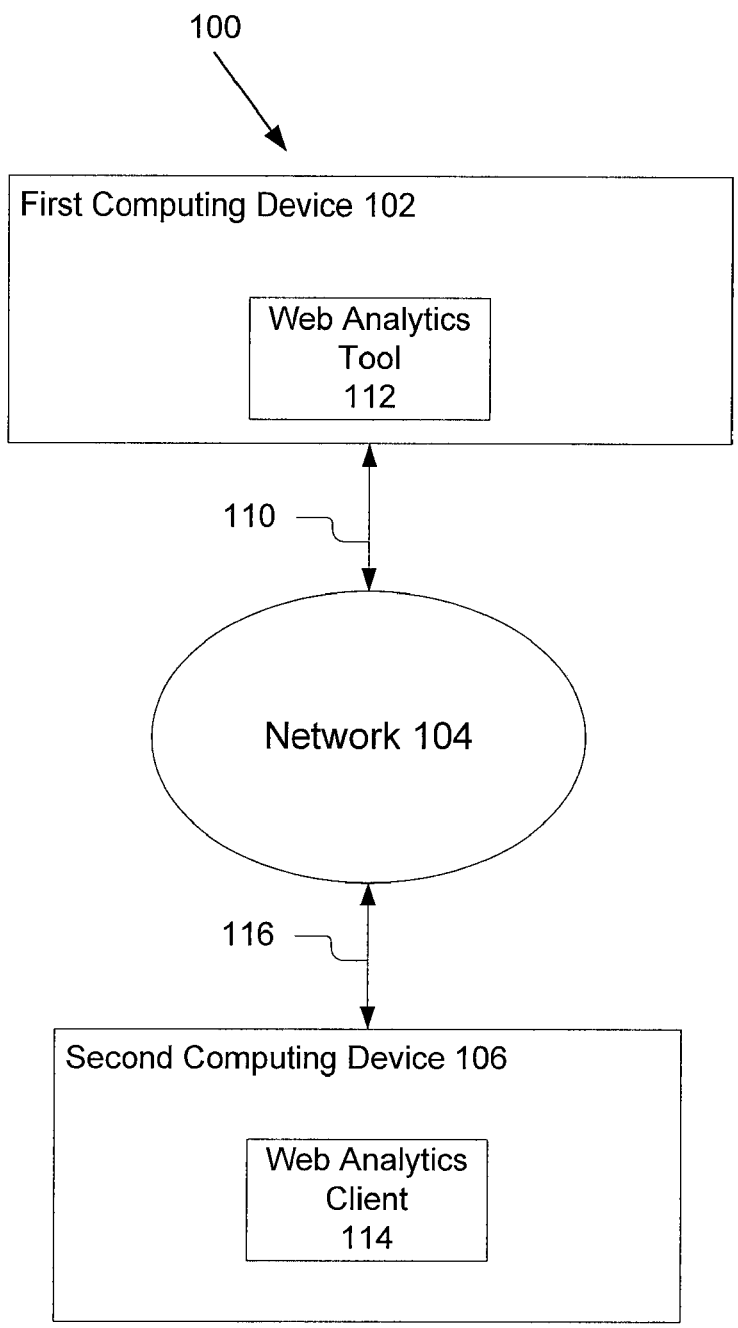
FIG. 1 is a block diagram of a first embodiment of a system for providing a segmentation workbench for manipulation and display of web traffic data on a real-time basis according to the present invention.

A segmentation workbench system 100 of the present invention providing web analytics analysis capability using a first computing device 102 and a second computing device 104 is shown in FIG. 1. The system 100 preferably includes a first computing device 102, a network 104 and a second computing device 106. The present invention will now be described in the context of a single first computing device 102 communicating with a single second computing device 106 for ease of understanding and convenience; however, a more typical application may be first computing device 102 communicating with many second computing devices 106. In general, the present invention provides a web analytics tool with flexibility and speed that operates using the network 104, the first computing device 102 and the second computing device 106.

The first computing device 102 is a conventional computing device such as a server and includes a connection to the network via line 110 and is capable of executing various programs such as the present invention. The first computing device 102 preferably includes storage devices for temporary and permanent storage such as memory and hard disk drive arrays. The first computing device 102 includes applications, programs and other code executable on the first computing device 102. The computing device 102 preferably includes a web analytics tool 112 and operates as a web server for web analytics and reporting for providing data from a data set representing interaction with web pages such as SiteCatlyst V.11 provided by Omniture of Orem, Utah. The web analytics tool 112 also includes a segmentation workbench; the functionality it provides, the user interfaces it generates and its operation in disclosed in detail below. When operating on the first computing device 102 these tools provide data to the second computing device 106 for presentation to the user. An exemplary display of such information by the second computing device 106 is shown below with reference to FIG. 5 et seq.

The network 104 is any one of a conventional type such as the Internet, a local area network (LAN), wireless network, or a wide area network (WAN). The network has predefined protocols for sending packets of data between devices coupled to the network 104. The network 104 may be of any conventional types and have any one of various topologies.

The second computing device 106 is a conventional computing device such as a personal computer, but also includes programs or code providing the segmentation workbench capability of the present invention. The second computing device 106 includes a web analytics client 114 responsive to the web analytics tool 112 of the first computing device 202 and user input to meet the web analytics and reporting needs of the user.

Client/Server Architecture

Figure 2:
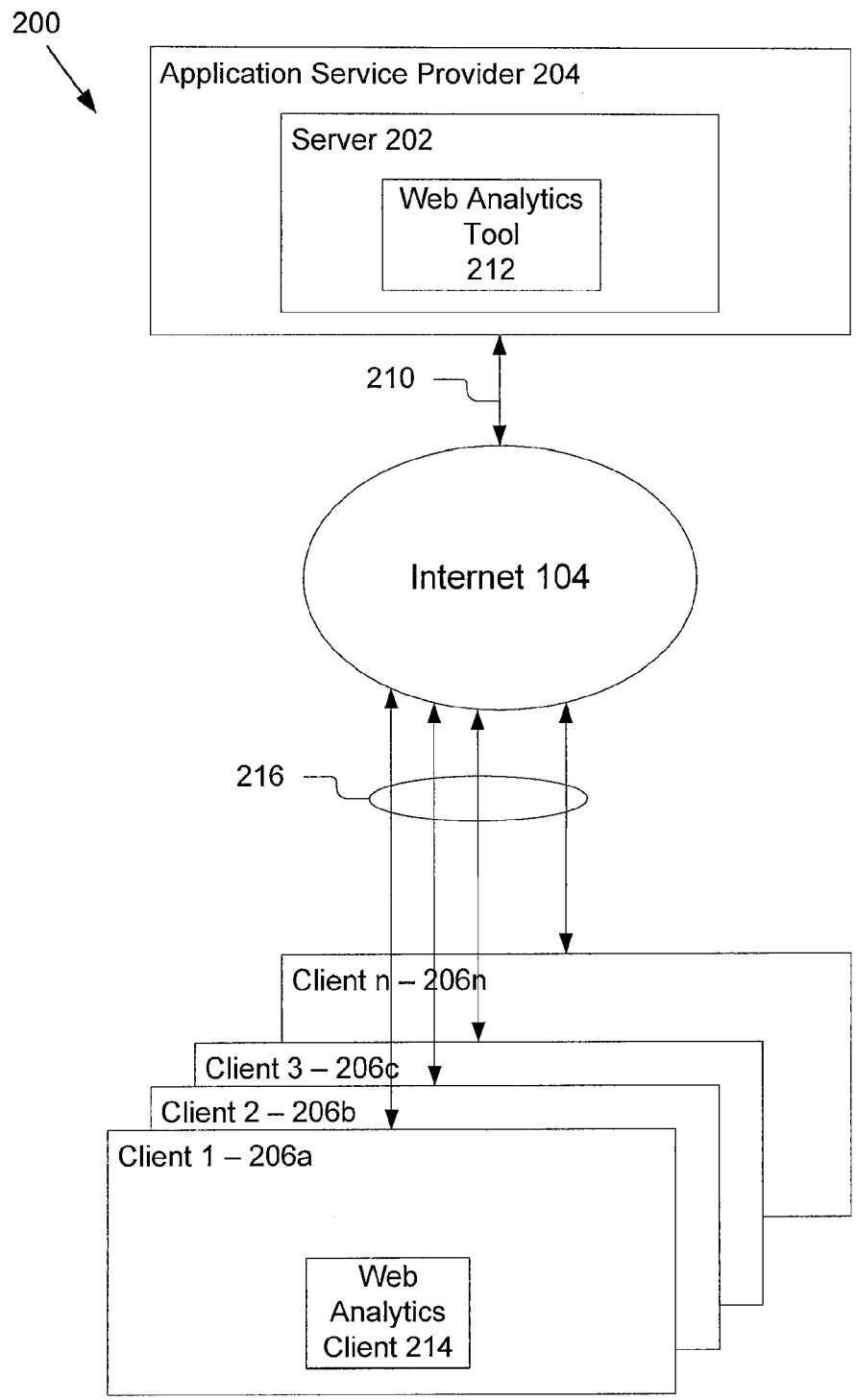
FIG. 2 is a block diagram of a second embodiment of an exemplary embodiment of the system for providing a segmentation workbench on a real-time basis in a client/server architecture.

Referring now to FIG. 2, a second embodiment of the present invention is shown. FIG. 2 illustrates how the present invention may be used in a client/server architecture to optimize the communication between a server 202 and several client computing devices 1-n 206a-206n. The present invention preferably uses an application service provider system 204 to provide the web analytics functionality. While only a single server 202 is shown, the application service provider system 204 could include a plurality of web servers, various other servers and backend architectures to provide the web analytics functionality according to an application service provider model. The server 202 preferably comprises a web analytics tool 212 similar to that of FIG. 1. With multiple client computing devices 206a-206n, the network connections of each greatly increase the amount of data that must be transferred. Each of the clients 206a-206n preferably includes a web analytics client 214 for communication with the server 202. This architecture is particularly advantageous because the users are able to have rich functionality of a web analytics tool and access to the data in real time. Moreover, this architecture allows web analytics service to be provided to users with an application service provider where the web traffic information for different users can be segregated and share a single server while communicating with different clients of different user companies. The architecture that supports this model is described in more detail below.

Application Service Provider Architecture

Figure 3:
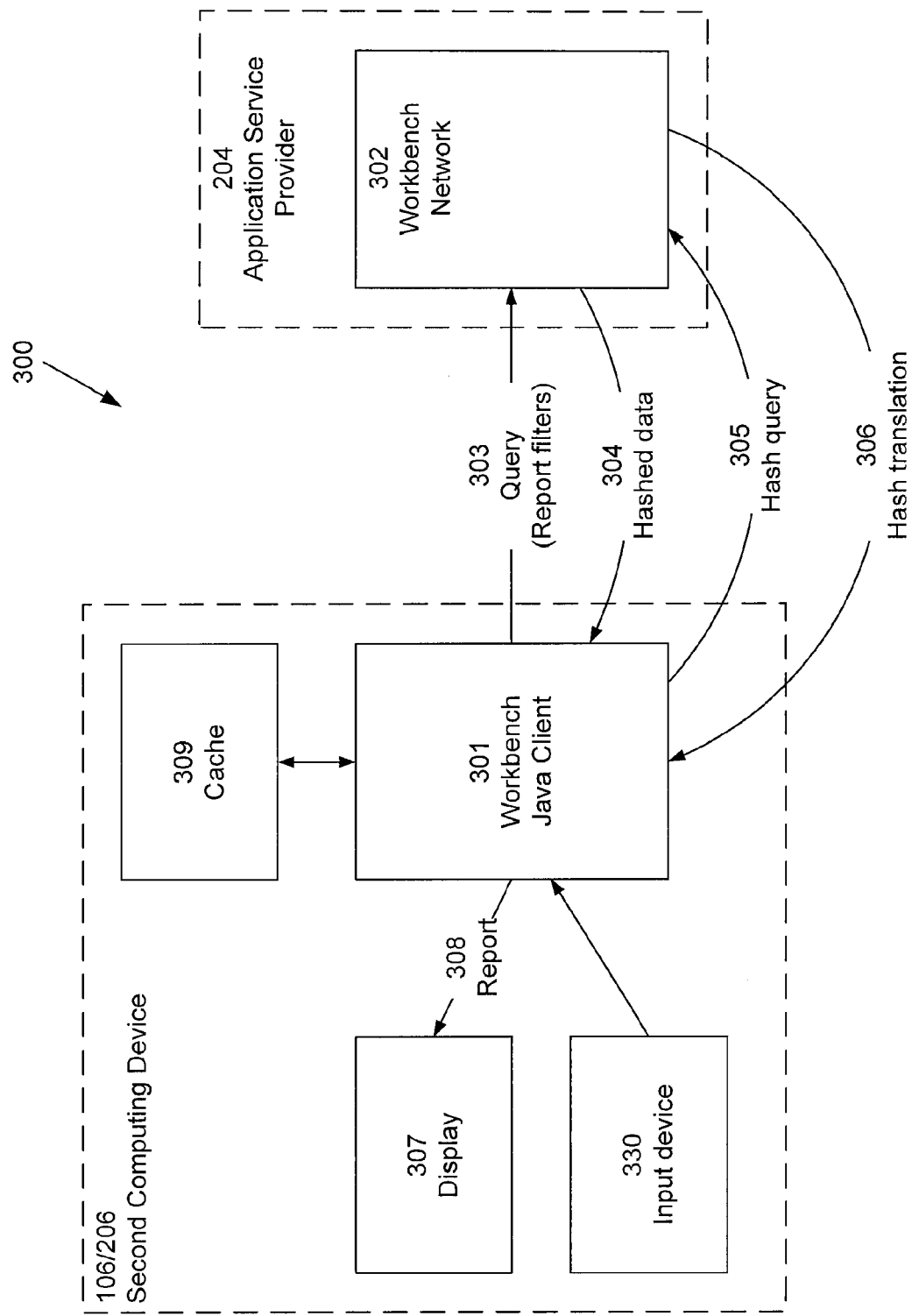
FIG. 3 is a block diagram of a third embodiment of a system for providing a segmentation workbench for web analytics according to the present invention.

Referring now to FIG. 3, there is shown an example architecture 300 for practicing the present invention according to the third embodiment. One skilled in the art will recognize that the invention can be practiced using other embodiments that differ from the examples shown.

Workbench Java client 301 runs on a personal computer 106/206 for viewing and interacting with website usage reports. Client 301 sends reports to display 307 (or other output device) for output to the user. Workbench network 302 is a centralized network for handling and responding to client requests for data on website usage.

In one embodiment, the user interface is implemented using a known environment such as Macromedia Flex, Java, DHTML, or any combination thereof.

In one embodiment, the components shown in FIG. 3 operate as follows. When a report is to be displayed, workbench Java client 301 sends query 303 to network 302, specifying which reports are requested, and optionally specifying one or more filters for the reports. In one embodiment, query 303 is in XML format.

In response to query 303, the workbench network 302 returns hashed data 304 that contains an encoded representation of the report data. For example, hashed data 304 may specify, in hash coded terms, the number of visitors that were using a specific web browser and that visited the website within a specified time period. This hashed data 304 is received by client 301.

Client 301 stores, in local cache 309, a list of previously received and decoded hash codes, so that it can correctly interpret a hash code that it has encountered previously. In one embodiment, local cache 309 is cleared at the end of a session, so that only those codes previously received in the same session are stored in cache 309. In other embodiments, local cache 309 is implemented in a more persistent or less persistent fashion, depending on user needs.

Upon receiving hashed data 304, client 301 consults cache 309; if cache 309 contains the hash code(s) in data 304 (in other words, if client 301 has previously received data containing the same hash code), client 301 can interpret the meaning of the hash-coded data without any further communication with network 302. If hash code(s) from data 304 is/are not present in cache 309, client 301 sends hash query 305 to network 302; network 302 responds by sending hash translation 306 to client 301. Hash translation 306 provides client 301 with the meaning of hash terms (for example, specifying that hash term #299 signifies a user using Internet Explorer 6.0). In one embodiment, client 301 stores this meaning in cache 309 for future use.

Once client 301 has received sufficient data to generate a report, it sends a report 308 to display 307 for output to the user. In one embodiment, if some hash meanings have not yet been received, client 301 still sends report 308, and report 308 states that certain hash terms are unknown. In another embodiment, client 301 displays an error message and/or waits until more complete hash meaning data is available.

The user can interact with the displayed report 308 via user input device 330 such as a mouse, keyboard, or the like. The user can click on areas within report 308; when the user clicks on an area that can be interpreted as a filter, client 301 generates and sends a new query 303 containing the new report filter criteria. The above process then repeats, and an updated report 308 is sent to display 307.

Figure 4:
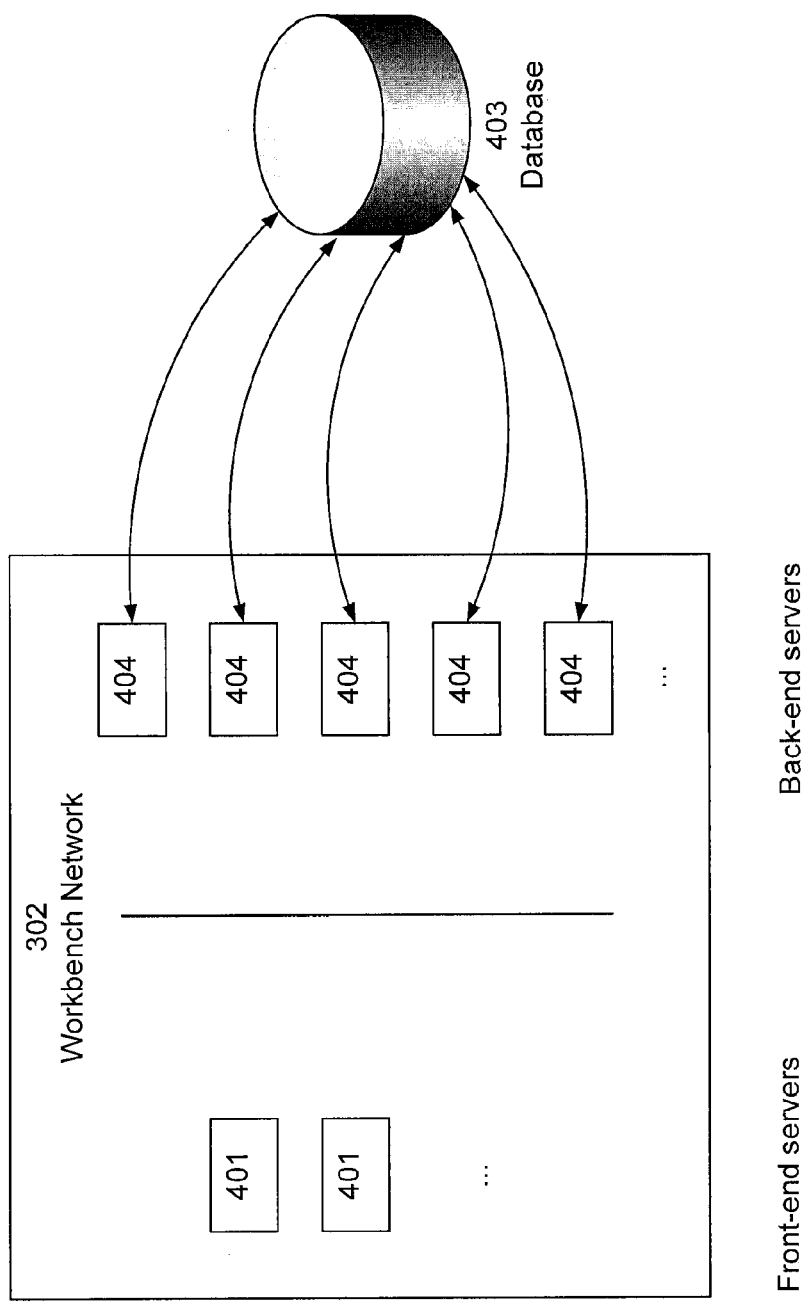
FIG. 4 is a block diagram of a preferred embodiment of a workbench network according to the present invention.

Referring now to FIG. 4, there is shown an example of an architecture for workbench network 302 according to one embodiment. Network 302 includes any number of front-end web servers 401 that receive queries 303, 305 from client 301, and any number of back-end servers 402 that obtain data from storage, analyze the obtained data, and send report data back to client 301. Back-end servers 402 send an appropriate data set to client 301 based on the filter request. For example, if a filter request specifies that the user is only interested in visitors that used a particular web browser, back-end servers 402 remove the data that does not match the specified criterion, and only forward to client 301 the data that does match. Conceptually, back-end servers 402 are applying a movable filter bar to the data set, maintaining consistency in the views into the data while changing the size of the data set according to the filter request.

Database 403 contains website visitation data, which in one embodiment is stored in a binary format stored in some storage medium such as a hard drive. In one embodiment, the website visitation data is broken up into files, or "bricks", to facilitate extraction of portions of the data. When servers 402 extract data from database 403, they are provided with specific bricks that match the criteria.

In one embodiment, when the user requests a report showing website visitation data for a specified time period, back-end servers 402 extract data from database 403 that contains web visitation logs and/or statistics. In one embodiment, servers 402 obtain data from database 403 that represents a snapshot of website visitation over a specified time period. Servers 402 then store this website visitation data in temporary local storage (such as random access memory), using for example a binary format that is encoded according to a hash algorithm so as to minimize bandwidth usage. In one embodiment, this binary format is identical to the format used in database 403, so that no file format translation need be performed when servers 402 extract data from database 403. Servers 402 and then apply filters as requested, and send the filtered data to client 301.

In one embodiment, whenever the user requests a broader date range for website visitation data, back-end servers 402 perform a new data extraction from database 403. However, when the user narrows the date range from a previously specified range, no new data extraction is performed; rather back-end servers 402 filter the previously extracted data according to the new filter parameters.

Segmentation Workbench Functionality

The segmentation workbench client 301 and the workbench network 302 (referred to collectively below as the segmentation workbench) allow users to mine sampled Data Warehouse data in real-time. The segmentation workbench provides a fast, responsive way for users to perform advanced analysis on data warehouse-style data via a graphical user interface. Users can launch various pre-packaged reports onto a single workspace and easily click on any data item to filter the entire result set by that item. This allows users to quickly answer questions such as "What were the top referrers that drove visits in which the user purchased Item X or Item Y and viewed the Clearance Sale page?" The results are returned almost instantaneously, enabling users to analyze the effects of combinations of factors.

The basic functionality provided by the segmentation workbench is to allow users select various reports, add items to the filter from within those reports, and quickly see the resulting change based on this virtual "WHERE" clause. The web analytics tool provides Page View, Visit and Visitor groupings that support the virtual "WHERE" clauses. All dimensions (Browsers, Products, etc.) technically offer the visit, visitor (hourly, daily, weekly, monthly, quarterly, yearly) and page view metrics, as well as the commerce metrics. The workbench supports various dimensions and metric, example of which are provided in Appendix A and B, respectively.

A particular advantage of the segmentation workbench is that it is able to return a response to a query or change to a report in real-time using sampled data from the data warehouse. By real-time, we refer here to the ability of the segmentation workbench to gather and display results within seconds for most filters, more specifically within 2 to 3 seconds.

Another advantage of the segmentation workbench is that it is presentation of data as well as making it downloadable. The workbench allows the user to download the Segmentation Workbench results in the standard download formats (currently HTML, PDF, RTF, Excel, CSV), at the window level. In one embodiment, a reportlet is downloadable in all of the standard download formats. The downloaded report shows the filter and data set information. The workbench also provides for PDF download of the workbench canvas (WYSIWYG) or a download of the workbench canvas to a spreadsheet where each report window is a different worksheet.

Workbench User Interface Functionality

Figure 5:
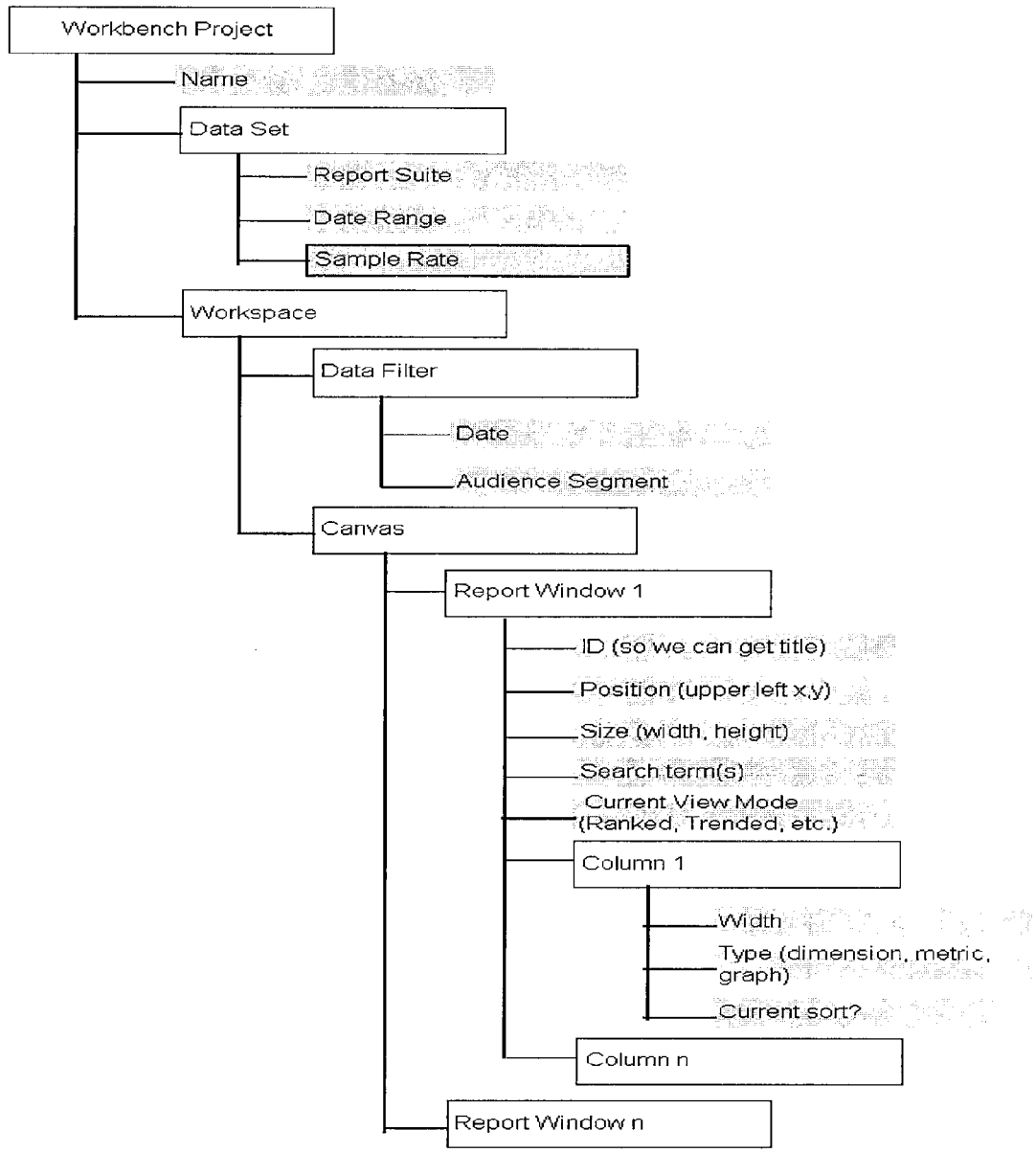
FIG. 5 is a diagram of the data relationships and their presentation by the segmentation workbench.

FIG. 5 is a high level overview of the data relationships and their presentation by the segmentation workbench.

A user can select any available report from the Reports menu, which launches a report window on the workbench "canvas." The user can also right-click at any time on the canvas to launch the Reports menu. When a report is launched, a mini version of that report is immediately displayed. The report window displays the default metric(s), and the data will be sorted by that metric, the system 300 defaults to visits. The user can customize the Default metric in the canvas Display Options, and even set them on a per-report basis. The user can change the metric(s) and add additional metrics (up to 10). The default number of data rows shown is 10, but the user can adjust this in the canvas Display Options.

The reports are provided in windows or containers that have functionality similar to common windows. For example, the reports include the ability to drag edges to change the height and width; ability to minimize, delete, and maximize; ability to reposition/rearrange windows on the canvas by dragging the window title bar. Further, the reports include: functionality to allow the user to drag the column margins to resize column width, data shown in the reports always reflects the current filter; and resizing or moving saves state, such that if the user does a hard refresh on the browser, the canvas looks the same. Various report views (taking the concepts familiar to the user in the standard online reports) are available including: View, Ranked, Over Time, Trended, Fall-out report, C&A, Graphical, Most Improved, Gantt, Tabular, Raw Data and Flexible. The workbench also allows the creation of custom reports. The workbench creates a "custom" report that allows the user to build a custom report with Date, Metric and Dimension axis (similar to Data Extract or the Excel Client Data Blocks). Furthermore, the workbench allows the user to switch between these reports or views, by providing a series of icons as will be shown in the drawings for switching between any of the views.

In addition to the concept of a workbench canvas, the present invention also maintains a corresponding project. The can save and later re-open a workbench project. When a user saves a project, the data set, filters, reports, and canvas appearance are all preserved. When a user opens a saved project, everything should look exactly as he left it. For example, if a user loaded data in January 2005, then on January 15 saved the project, and then opened that project again on January 18 . . . in this case, the data set is technically different. The user is either warned that the user cannot specify a data set date range that includes time in the future or the workbench loads data up through January 18, and warns the user that data shown has changed because more data was added to the data set. Users can share workbench projects with other users. The owner can save over the original shared project (application should alert the user and remind her that she is saving the "networked" version). Non-owners can open shared projects, but any auto-save should actually apply to their own copy. When they explicitly click "Save project", they are prompted that they're using a shared project and can save their own copy in their own folder. Any time the user tries to leave an unsaved, altered project, the workbench prompts him: "Any changes that you have made will be lost. Are you sure you want to proceed?" For example, if the user clicks the "New Project" icon or the "Open Project" icon, the application prompts him appropriately. Workbench performs an "autosave" on open projects periodically. By default, the workbench auto-saves the project every 5 minutes. The user can customize this auto-save frequency. Also, this can be combined with a limited versioning system, such that users could theoretically "undo" changes to the last version. If the workbench ever ends a session with the user (due to inactivity), it first saves everything as-is so that next time the user can begin where he left off. If the user has been inactive in a workbench for 15 minutes, the application prompts the user, asking him if he wants to continue to use the workbench. If the user doesn't respond to the prompt within 5 minutes, then the application saves the project for the user to access later, and will free up the workbench slot. The application updates the display, indicating that it prompted the user and did not receive a response, so it saved the project and has closed the workbench.

The canvas also enables the workbench canvas to provide user definable data filters. The workbench allows the user to apply two types of canvas filters: date and segment. The user can filter the data by date, and the workbench preferably allows the user selects several different over-time or trended reports. The default is to force the same level of granularity for all reports. The user can also customize the granularity on a per-report basis. The user can filter the data by segment. Using tools such as a segment builder interface as described in co-pending U.S. patent application Ser. No. 11/313,445, filed Dec. 20, 2005, entitled, "Creation Of Segmentation Definitions" which is incorporated herein by reference, the user can create segment definition for grouping and filtering the data. The workbench allows the user to select a segment to be used in filtering—e.g., a user can click on the funnel icon next to an element, which automatically adds that element to the filter. In one embodiment, the funnel icon is a toggle switch to add-to-filter or remove-from-filter. Right-clicking on the funnel icon will show an options menu that allows the user to choose functional options such as Change to "AND," Change to "OR, or "Remove from filter"

Finally, there are additional features provided by the workbench. For example, the workbench allows the user to set the sampling rate for the raw data that is used to generate the data warehouse or set used by the workbench. The workbench interface can be combined with other user interfaces provided by the web analytics tool 112/212 such as also the Data Warehouse interface. The workbench also the user to "Undo" actions or versions as was briefly noted above. The workbench also the user to store their working environment. The user can save everything associated with the workbench view—including report suite, date range, sample rate, etc.

Figure 6:
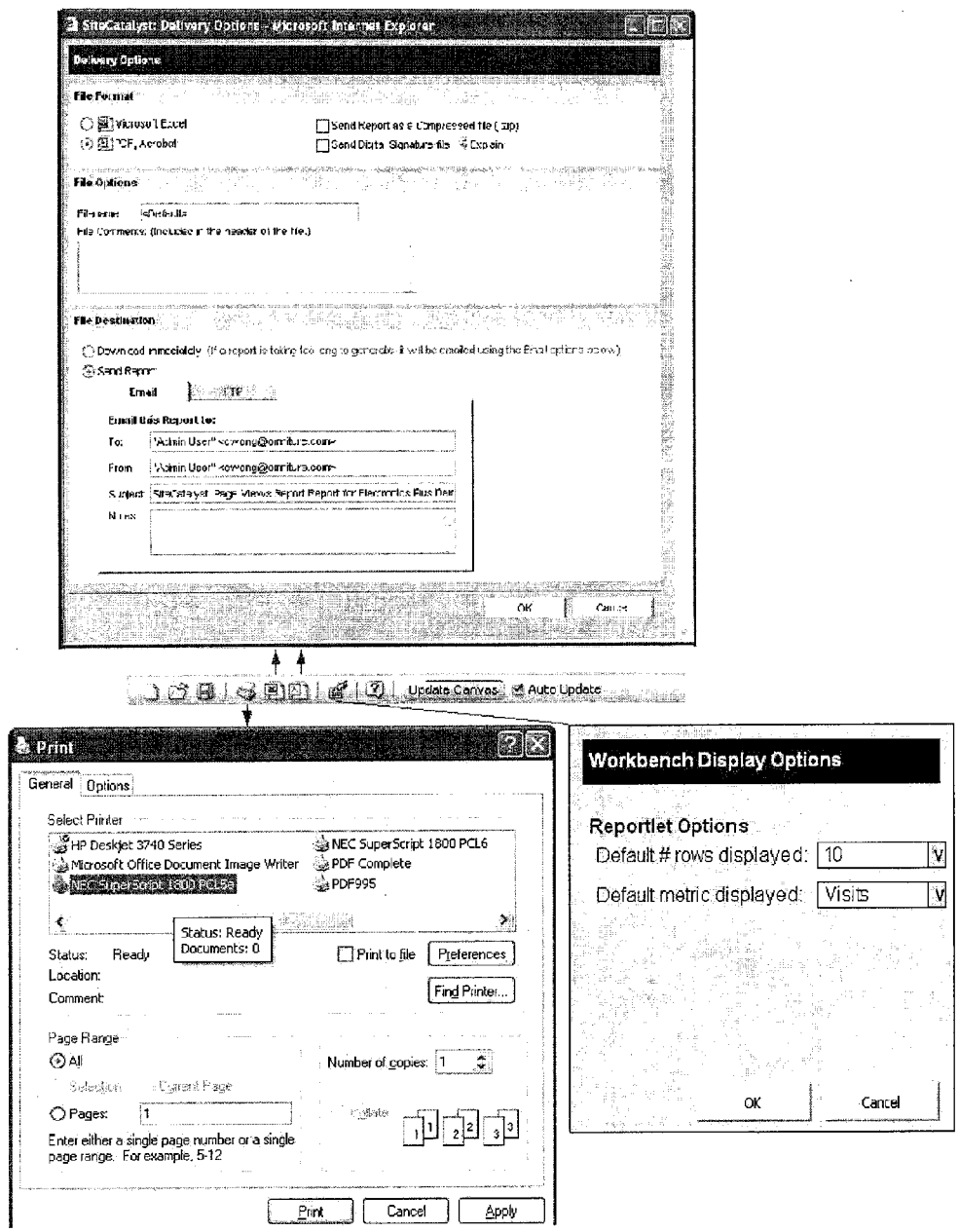
FIG. 6 illustrates an exemplary embodiment for a workbench tool bar.

FIG. 6 illustrates a diagram of exemplary embodiment for a workbench tool bar that can be added to other user interfaces, and that also shows the screens or interfaces that the user transitions to based on selection of the buttons in the workbench tool bar.

Figure 7A:
FIG. 7A to 7V are exemplary graphical user interfaces provided by the segmentation workbench of the present invention.
Figure 7B:
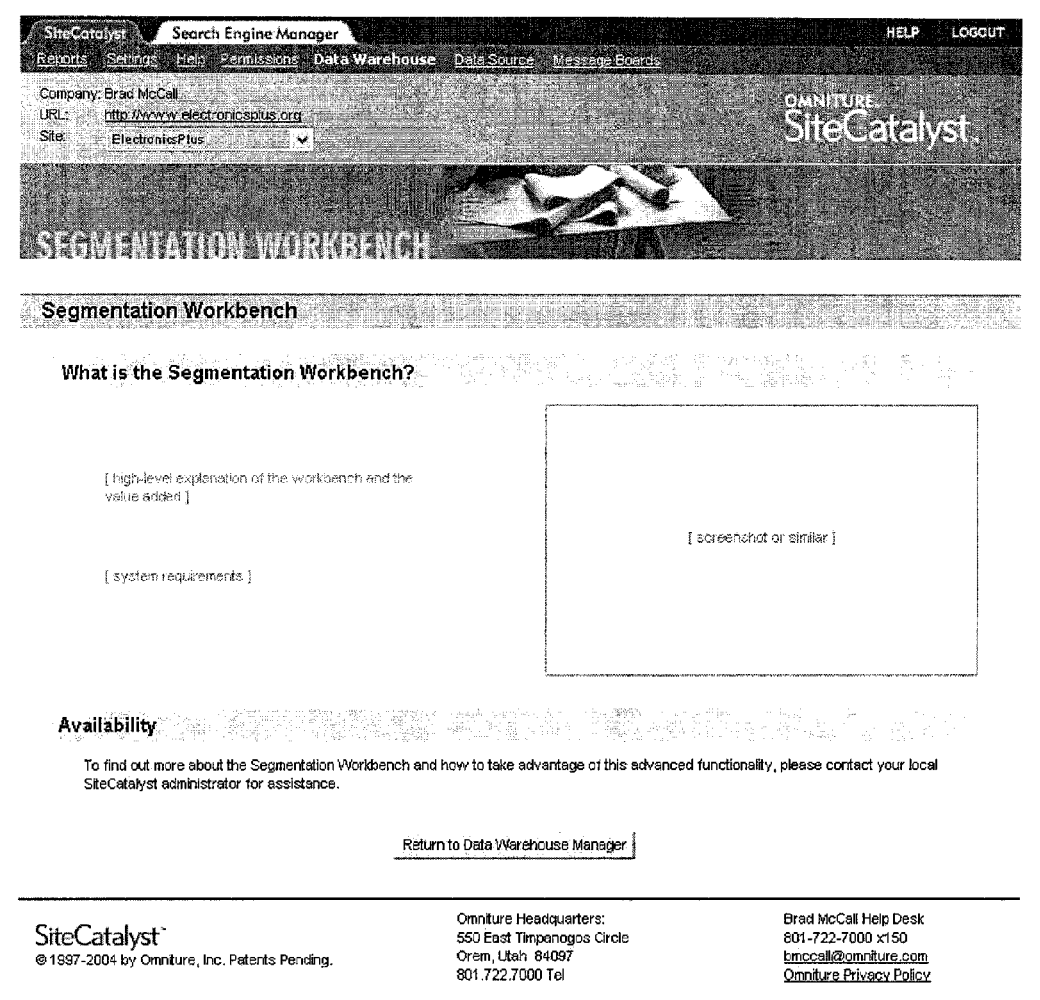
Figure 7C:
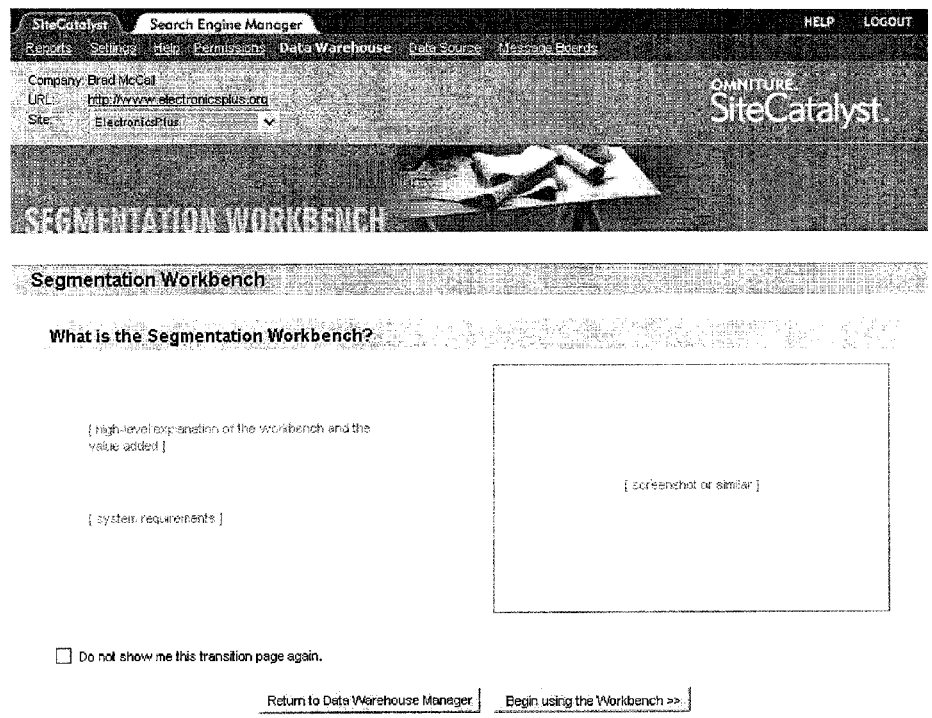
Figure 7D:
Figure 7E:
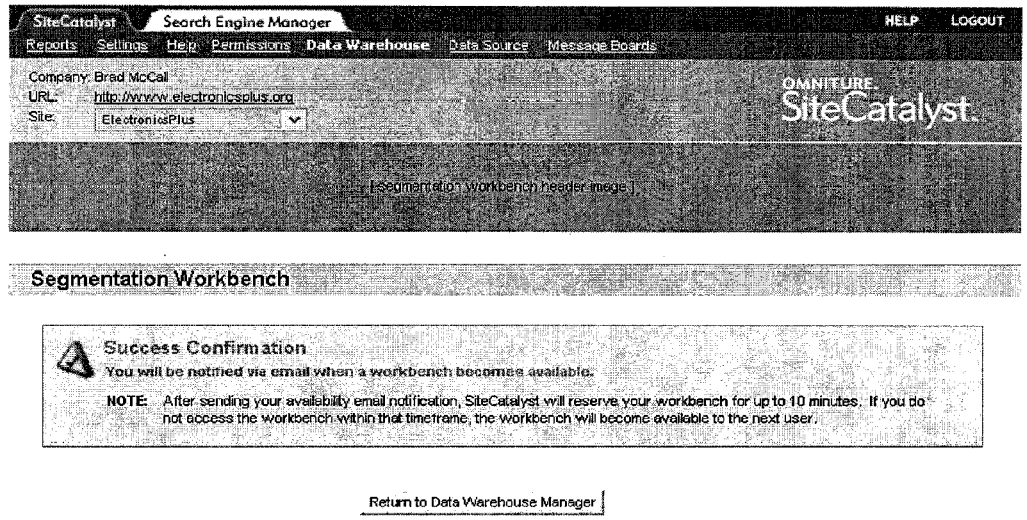
Figure 7F:
Figure 7G:
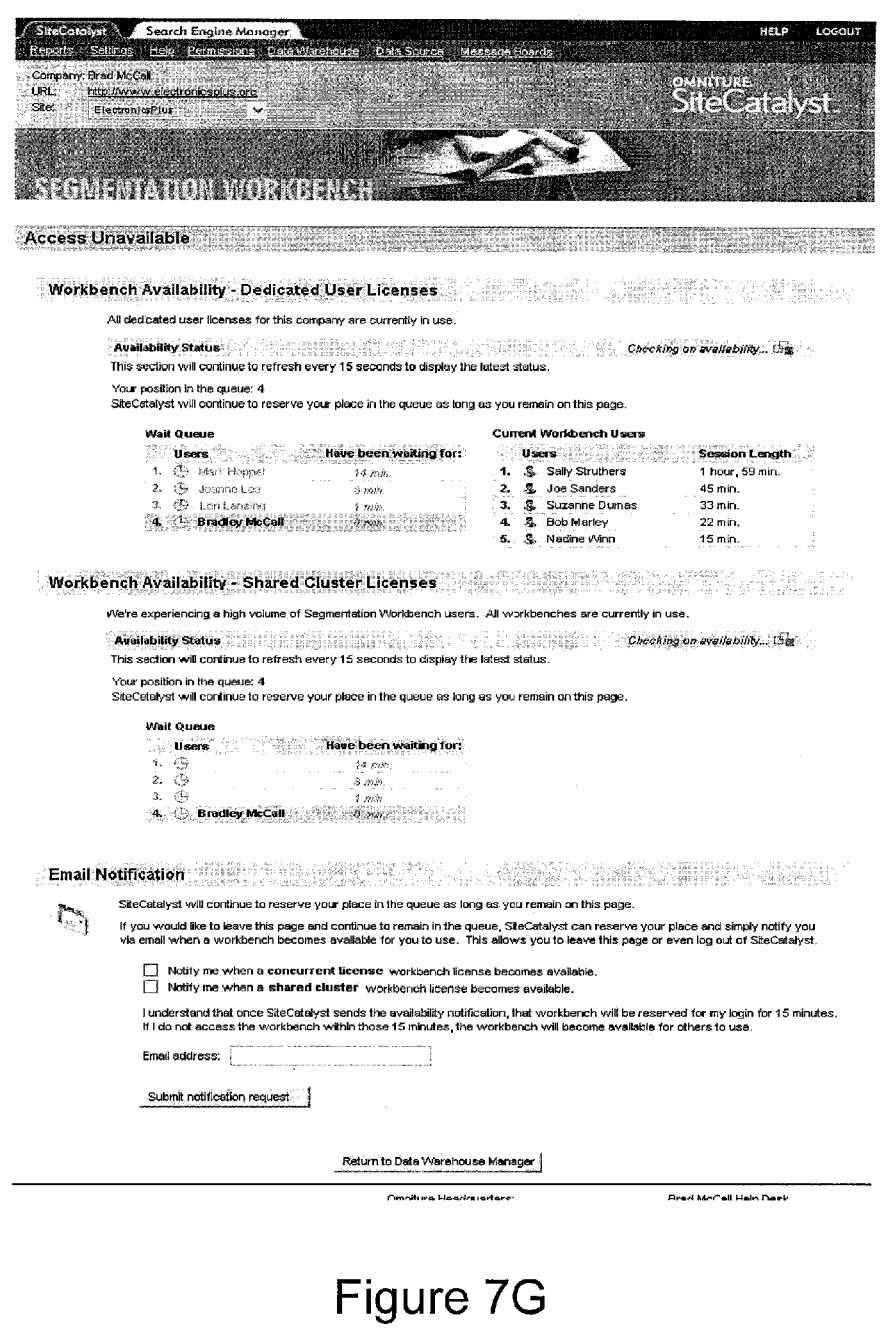
Figure 7H:
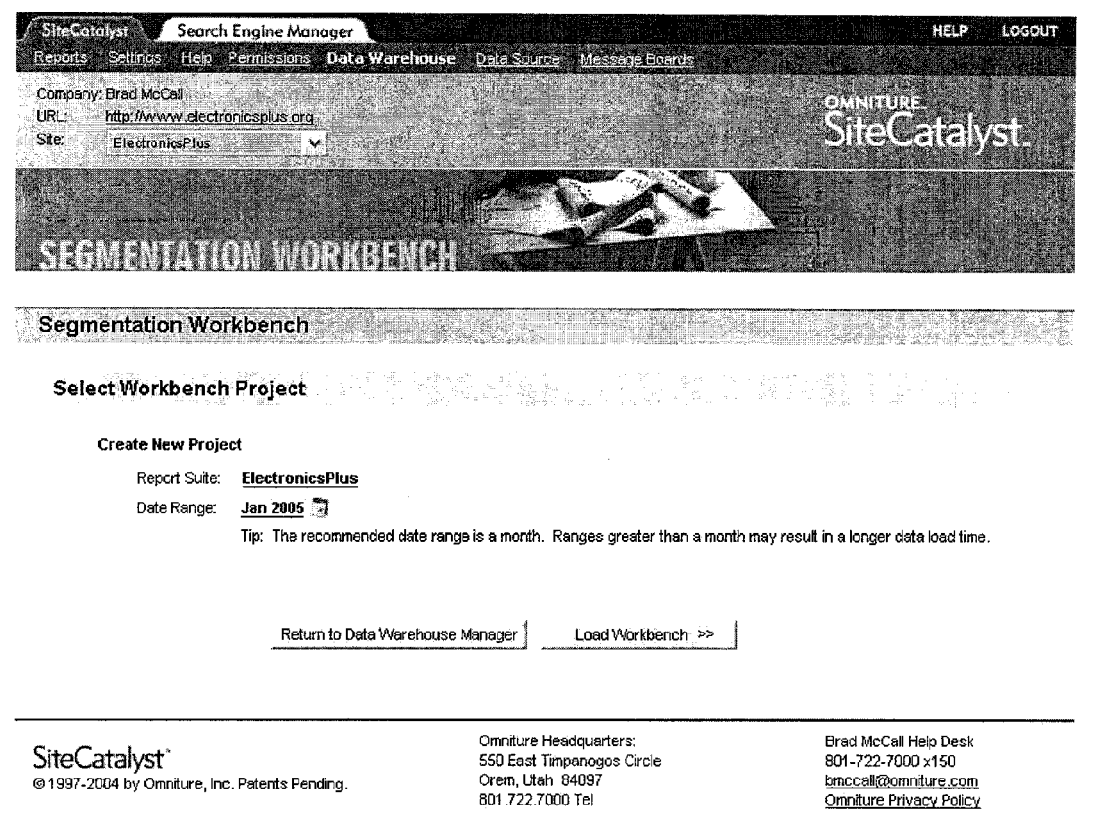
Figure 7I:
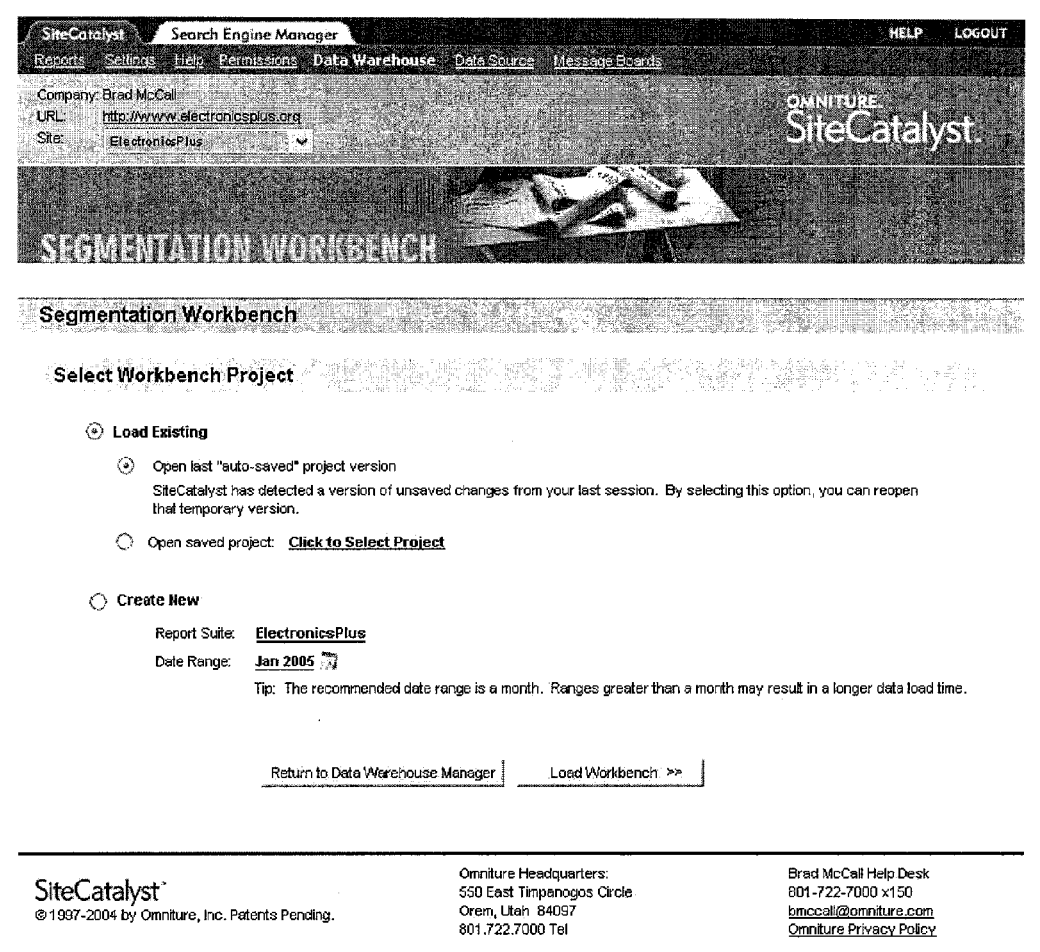
Figure 7J:
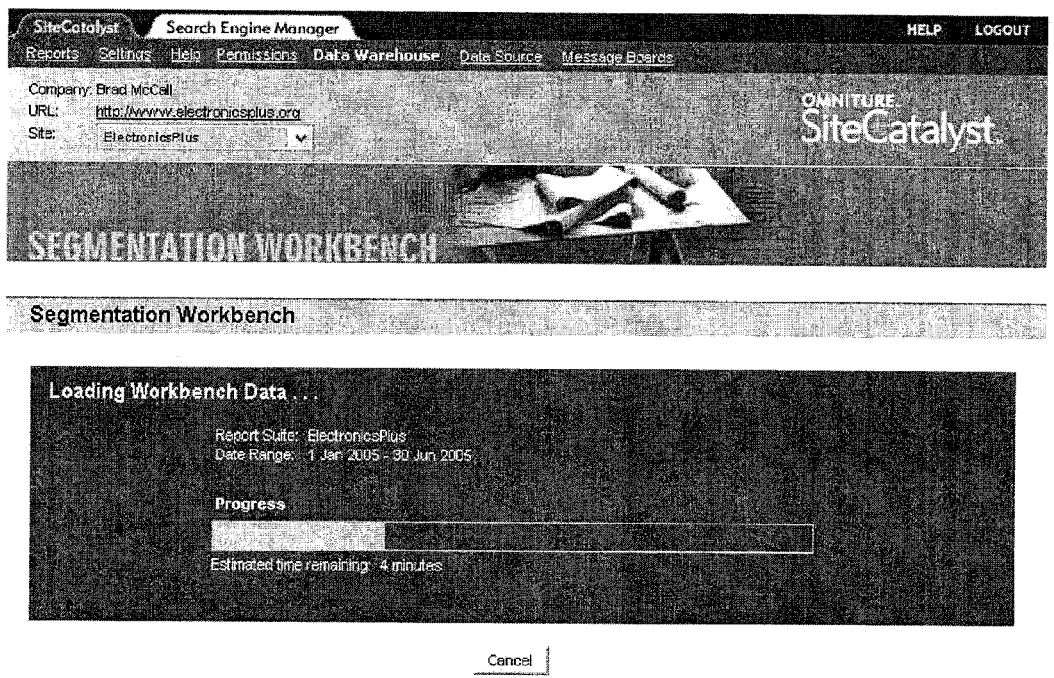
Figure 7K:
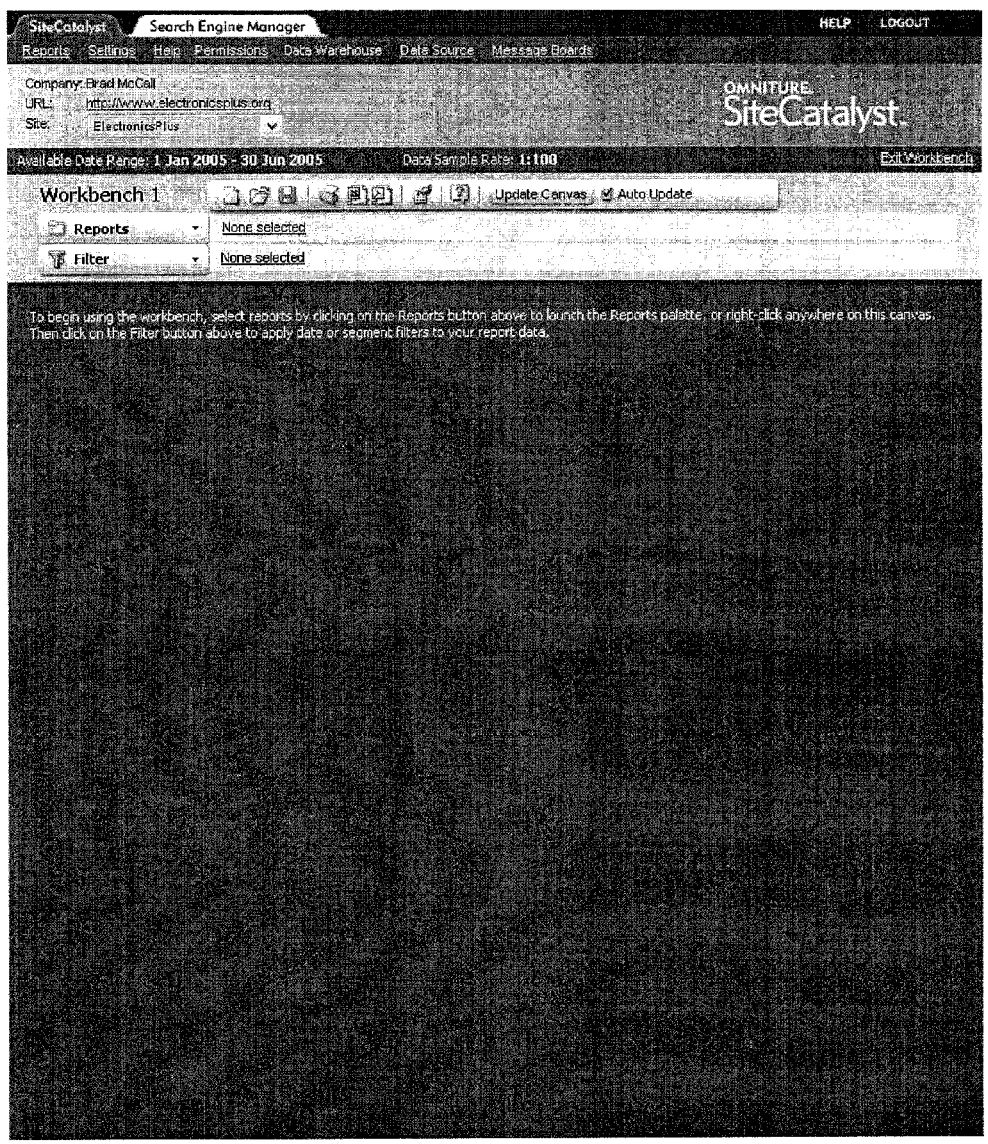
Figure 7L:
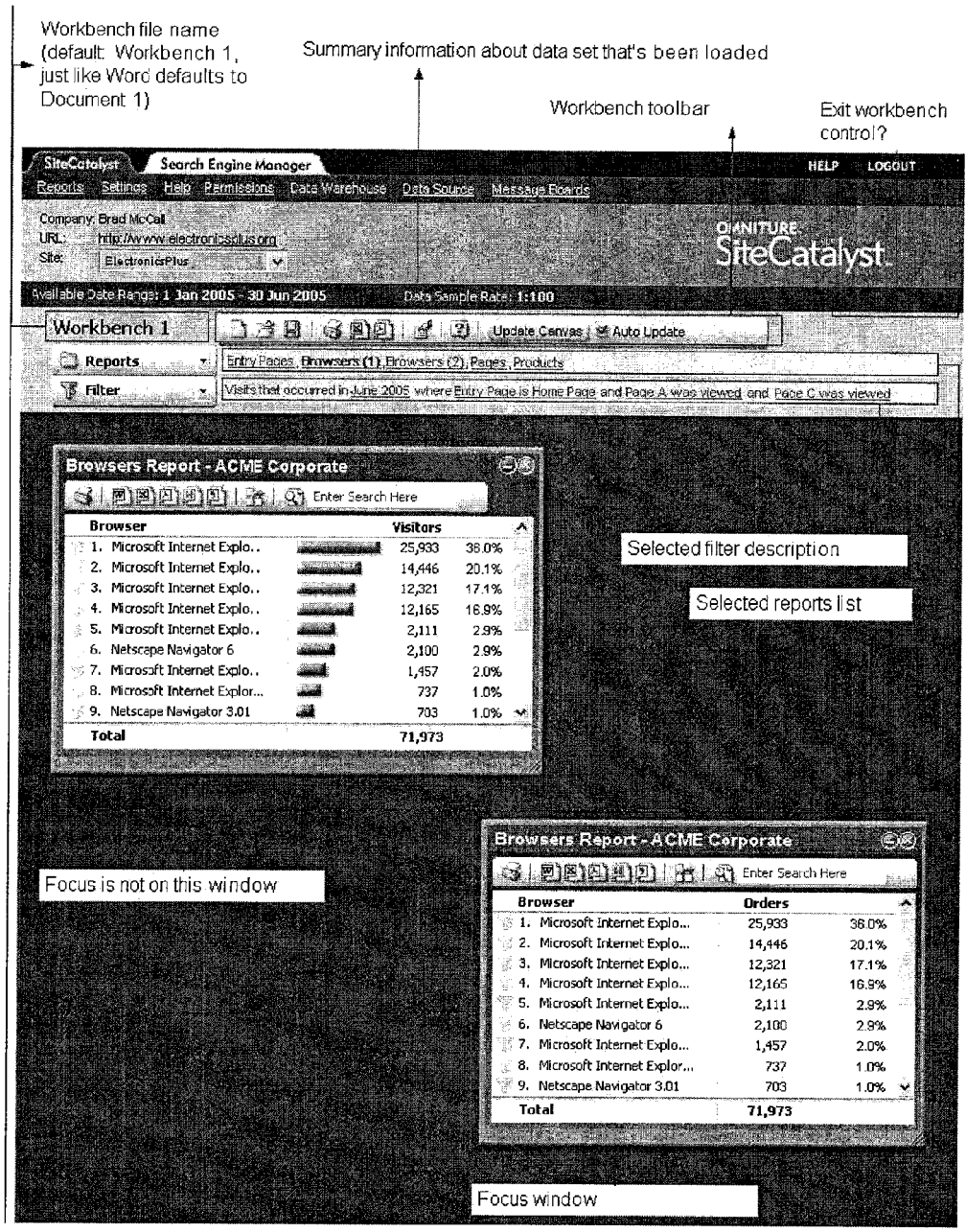
Figure 7M:
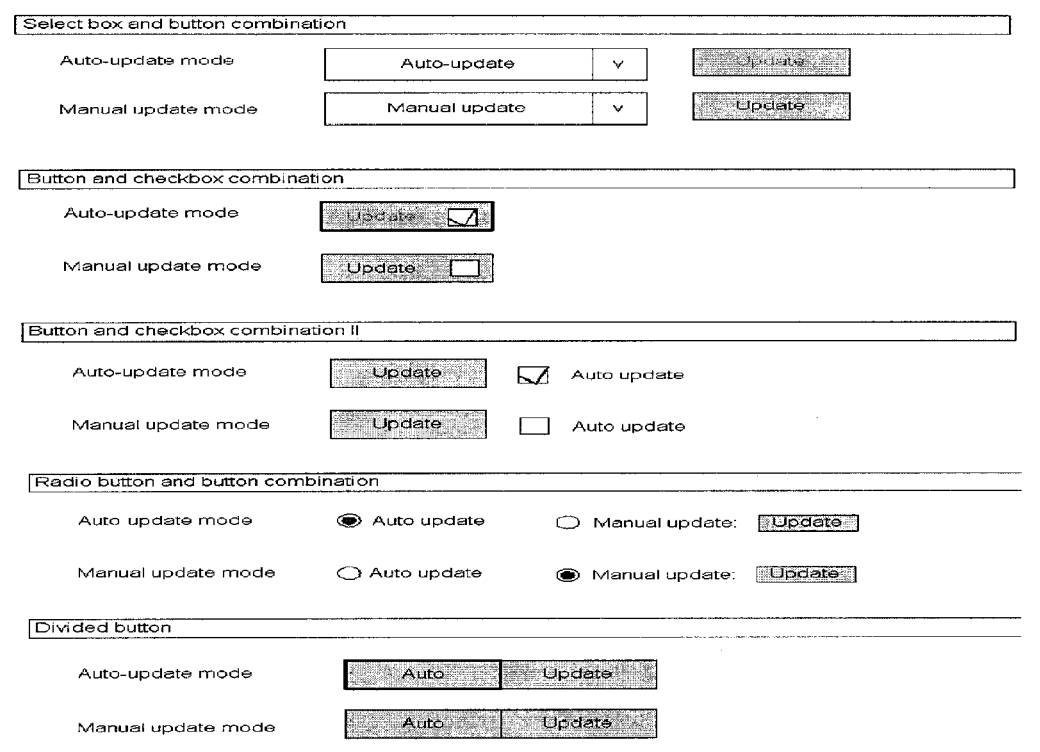
Figure 7N:
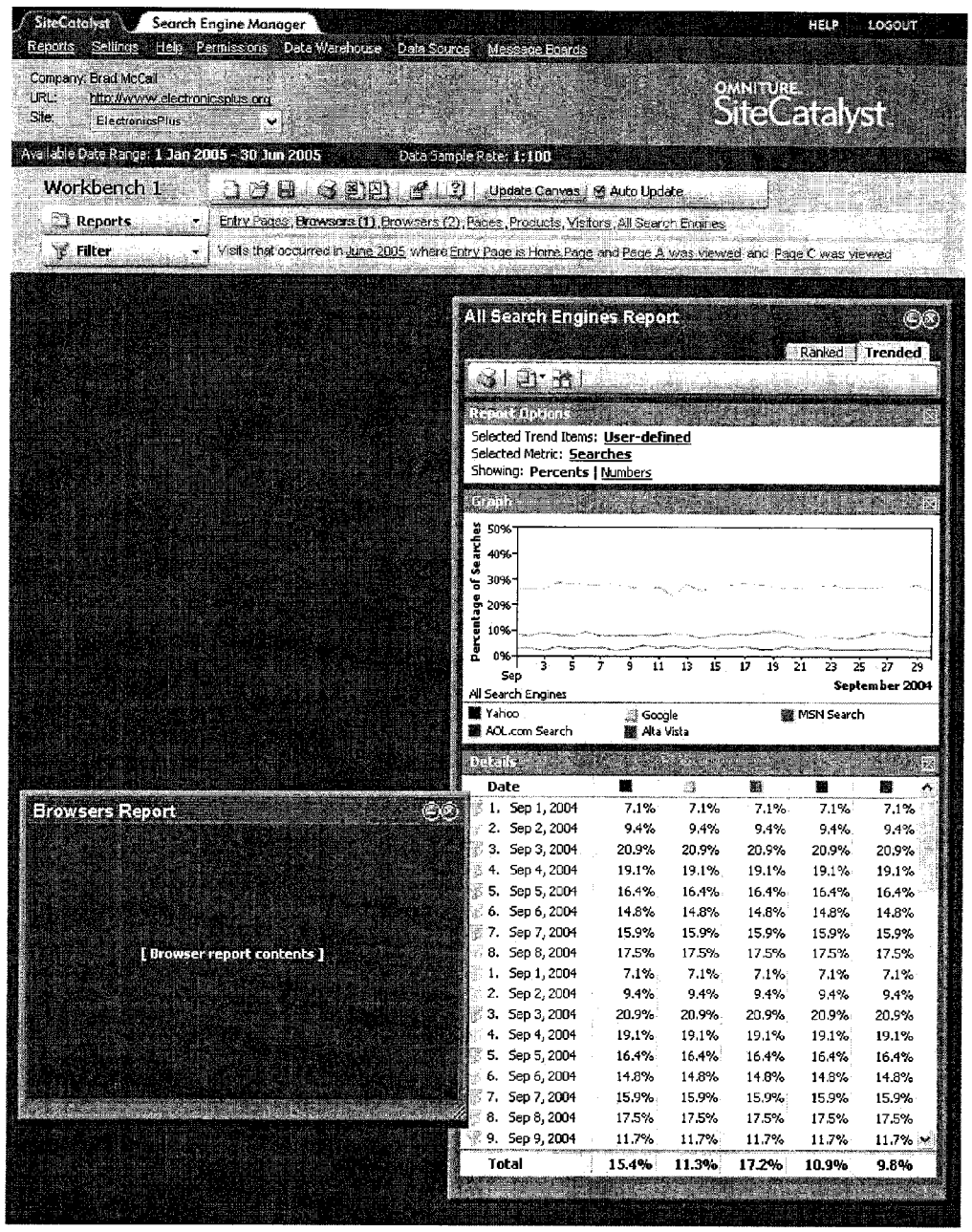
Figure 7O:
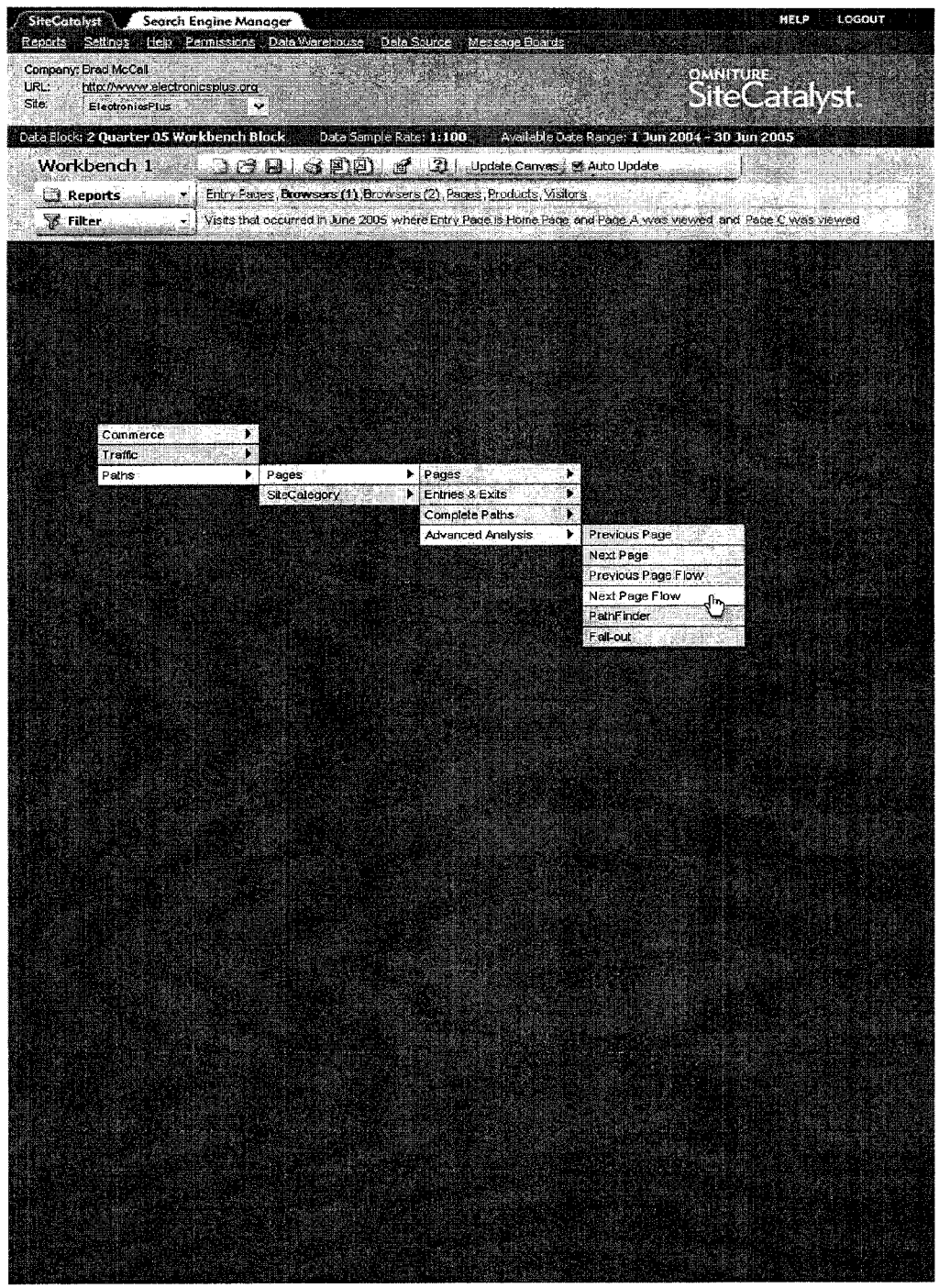
Figure 7P:
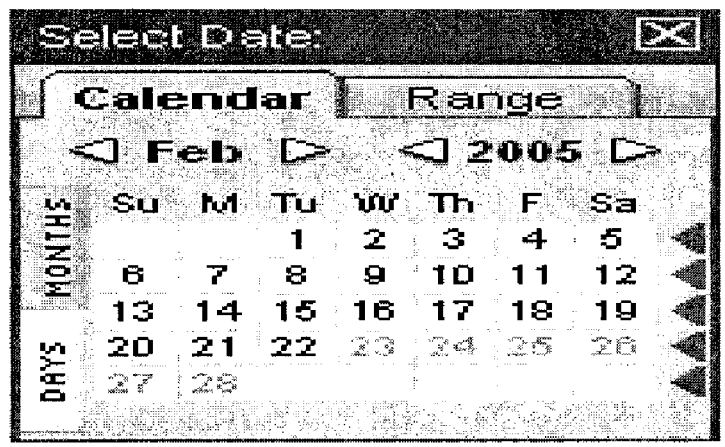
Figure 7Q:
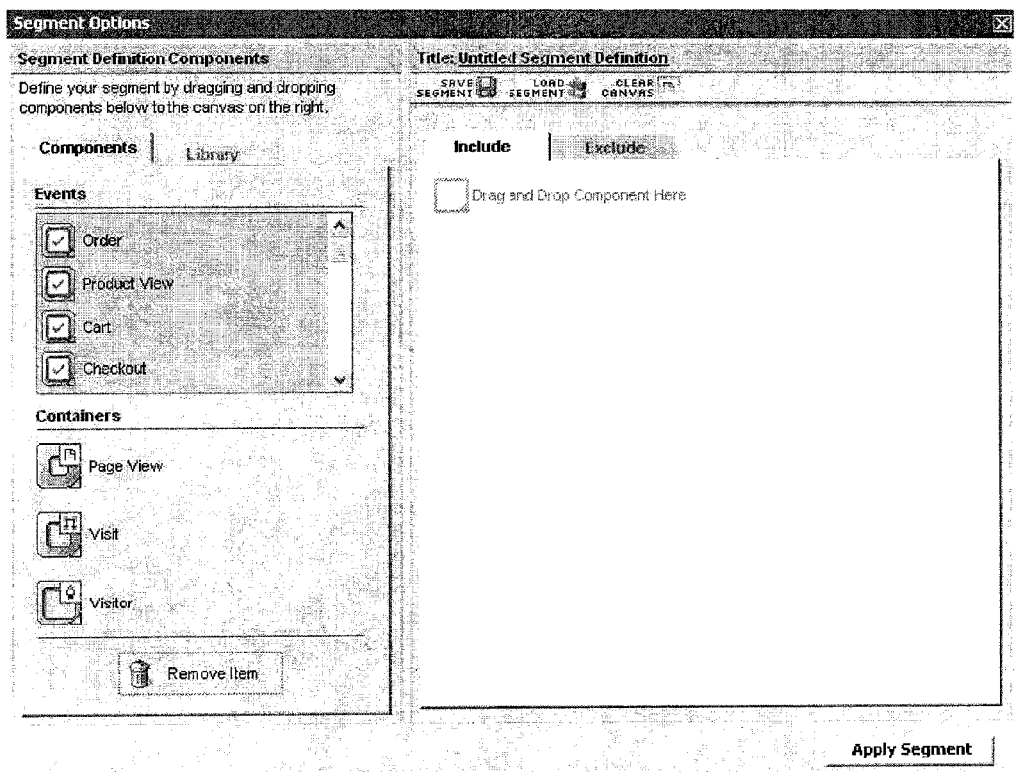
Figure 7R:
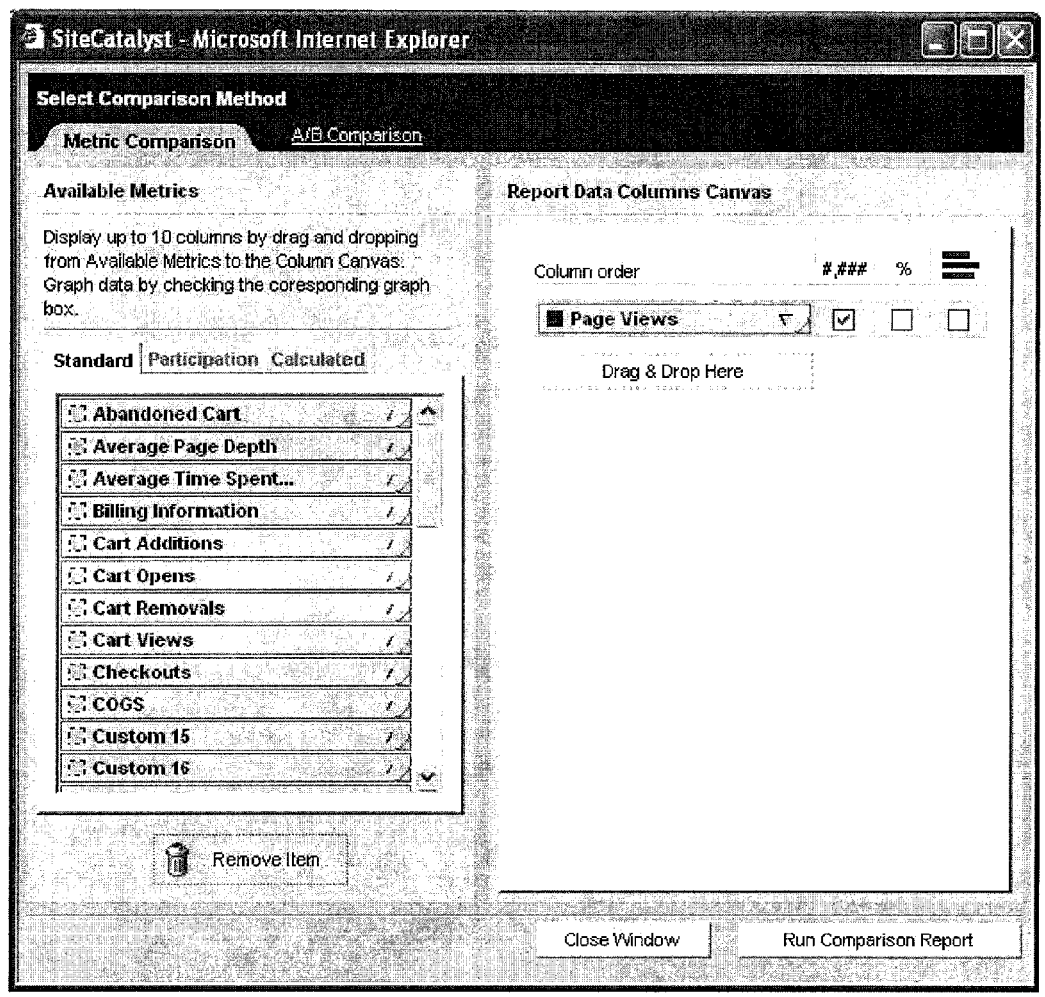
Figure 7T:
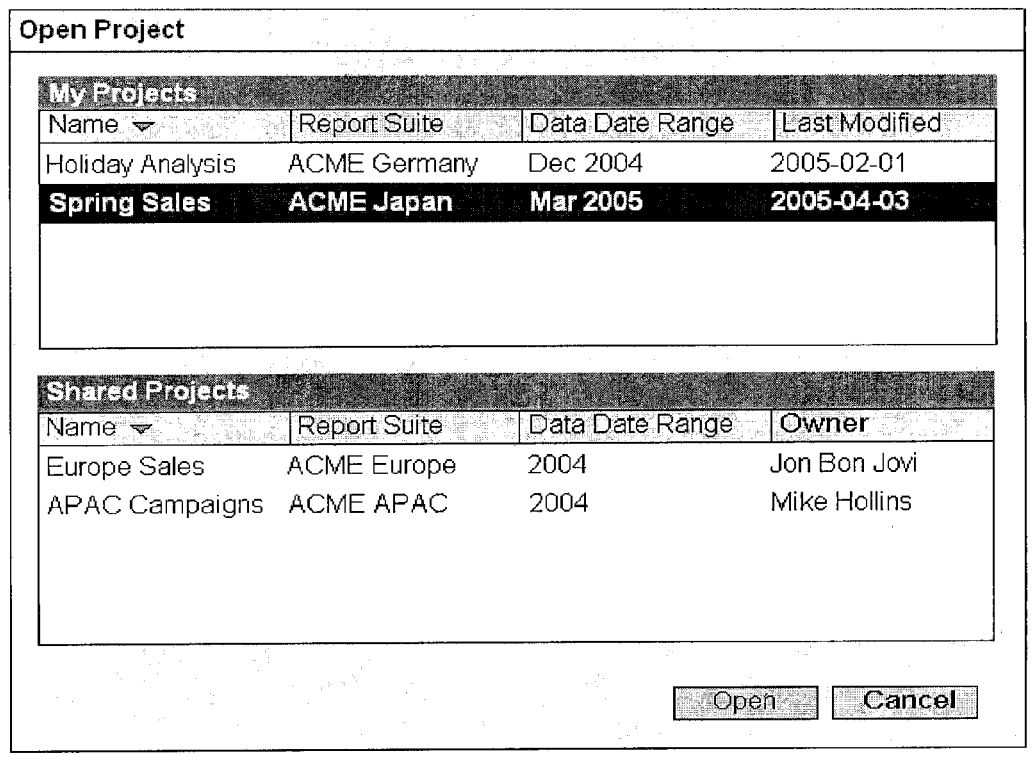
Figure 7U:
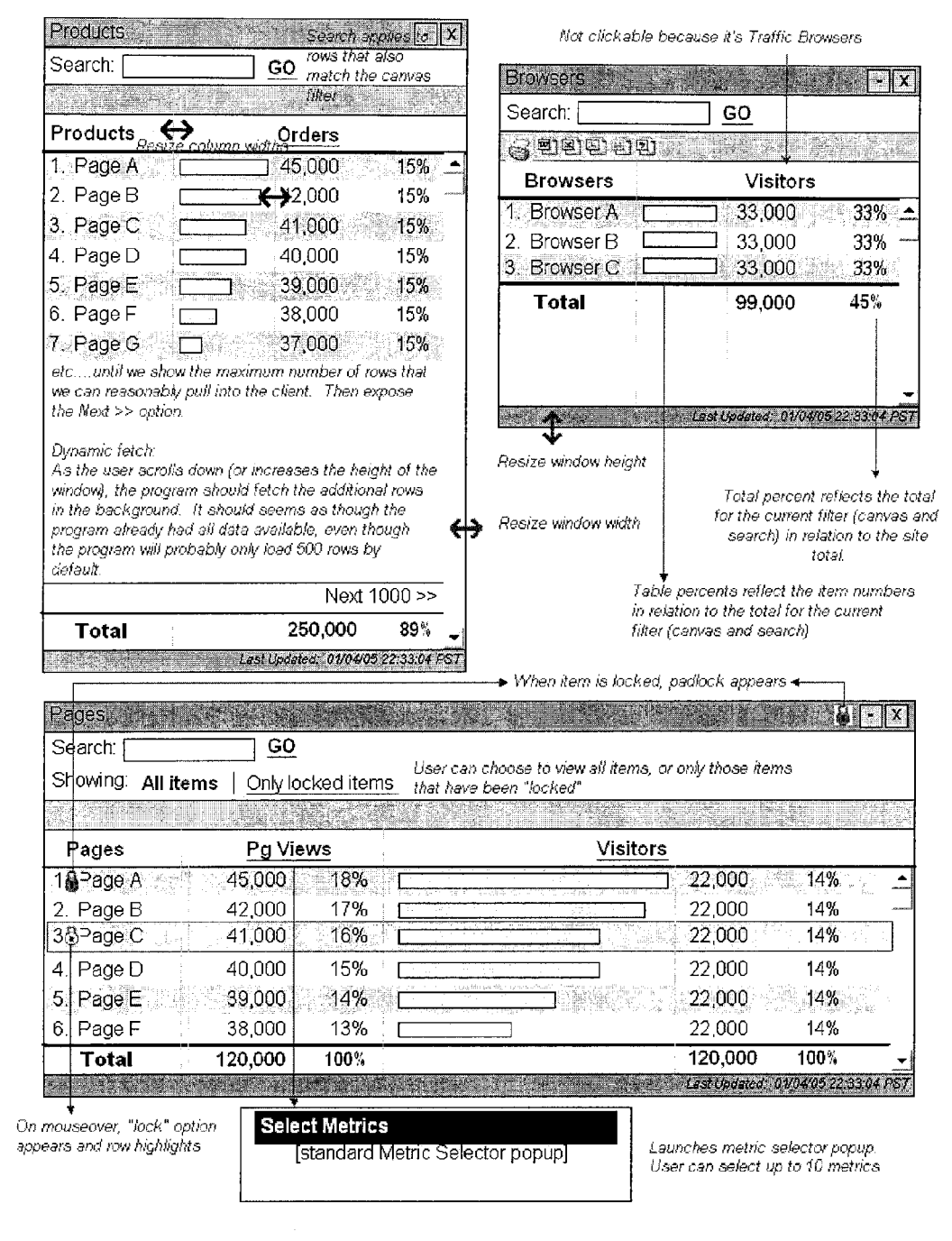
Figure 7V:
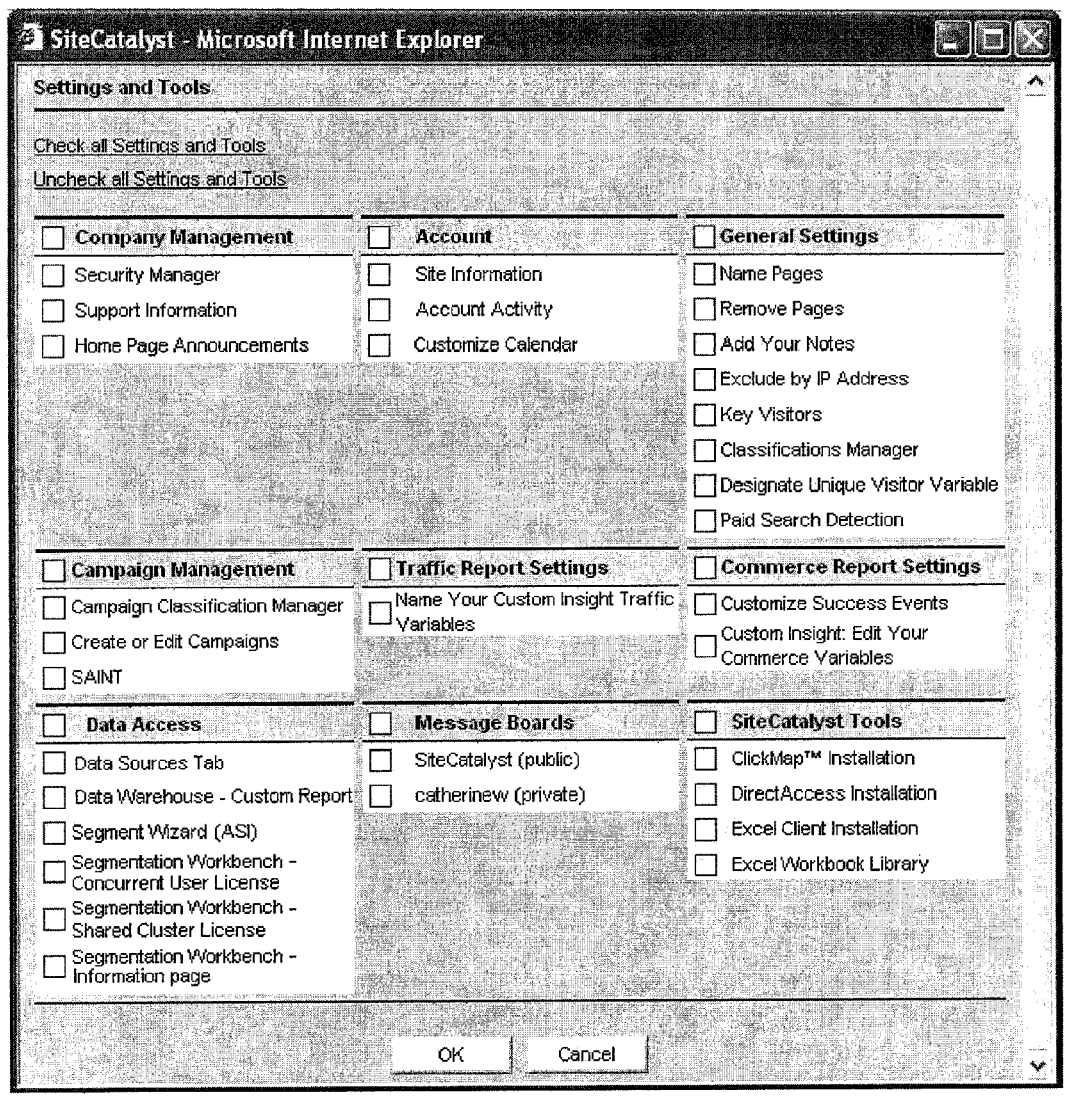

Referring now to FIG. 7A to 7V, exemplary graphical user interfaces provided by the segmentation workbench of the present invention will be shown and described.

FIG. 7A is a graphical user interface that is displayed in response to the data warehouse tab.

FIG. 7B is a graphical user interface that is displayed if the user does not have a license and is not an administrator. The user interface directs the user to contact their local administrator to find out about the workbench service.

FIG. 7C is a graphical user interface that is displayed if the user has a license. The purpose of this page is to explain to first-time users what the workbench is, and allow them to transition into using it.

FIG. 7D is a graphical user interface that is displayed if the user has workbench license, but no servers are available (concurrent license model only). The web analytics tool 112/212 continues to reserve the user's place in the queue as long as they remain on this page. If the user wants to leave this page and continue to remain in the queue, the web analytics tool 112/212 reserves the user's place and simply notifies the user via email when a workbench becomes available for use. This allows the user to leave this page or even log out of web analytics tool 112/212. The web analytics tool 112/212 sends the availability notification, an example of which is shown in FIG. 7E, and workbench reserves my login for 15 minutes. If the user does not access the workbench within those 15 minutes, the workbench will become available for others to use.

FIG. 7F is a graphical user interface that is displayed if the user has workbench license, but no servers are available (dedicated user license model only). If the user is an administrator, he can see the session length for each of the current workbench users. If the user is an administrator, when he moves the cursor over the user names, a tooltip will display the user's company if the company differs from the one he's currently logged into. The status bar could just be an animated gif that takes a predetermined time to fill. Every predetermined time, the page will refresh and the status bar will continue to fill.

FIG. 7G is a graphical user interface that is displayed if actually has access to both license models but there are no servers available in either group (highly unlikely scenario).

FIG. 7H is a graphical user interface that is displayed where the user has workbench user license and server is available, but the user doesn't have any existing projects (all first-time users). The user interface provides load time estimates/recommendations on this screen.

FIG. 7I is a graphical user interface that is displayed where the user has workbench user license, a server is available, and the user has existing projects. If a user has an existing project, the workbench defaults to the "load last project" option, since it's highly likely they'll want to continue where they left off. If the workbench detects that the user left last time without saving his final changes, then the "Open last auto-saved project version" option is displayed. If the user saved his final changes, then that "Open last auto-saved . . . " option should be replaced with: "Open most recent project: [project name]".

FIG. 7J is a graphical user interface that is displayed when the workbench data is being loaded.

FIG. 7K is a graphical user interface for a blank workbench canvas. Until at least a single report and at least a single filter is applied, the "To begin . . . " text is be displayed by the user interface. Once a report and filter are applied, the "To begin . . . " text either disappears or changes to a dark color. To begin using the workbench, the user selects reports by clicking on the Reports button above to launch the Reports palette, or right-click anywhere on this canvas. Then the user clicks on the Filter button above to apply date or segment filters to your report data.

FIG. 7L is a graphical user interface for a blank workbench canvas with different parts of the workbench canvas parts labeled. This illustrates the main functional components of the workbench. The Workbench toolbar allows a number of operations including: Create new project, Open existing project, Save project, Print canvas, Download canvas (for example in PDF or Excel), Display Options (with default number of rows and metrics), Help, Clear canvas, Update canvas. An Auto-update option enabled means that clicking on the filter icons (the "funnels") takes effect immediately. If the auto-update option is disabled, then the user can click on several filter icons, and the hit the "Update" button for all changes to take effect at once. The default is to "Auto-update". An example user interface for the Auto update functionality is shown in FIG. 7M.

FIG. 7N is a graphical representation of an exemplary user interface for reports. The report windows general components including: Tabs to select views, a Toolbar, an Options section (yellow subheader in the online reports), Graphs and Tables. The user can customize the report window with Dashboard functionality to show or hide graph, table, etc. The user can click the "x" to remove any section where applicable. To get the section back, the user can right-click within the window and choose "Show Graph", "Show Details Table", etc. Or, the user can click on a "Display Options" icon in the report window toolbar. It is possible for a user to remove all sections and have an "empty" report window. If the report window is empty, then text appears that instructs the user on how to display sections (similar to the canvas behavior on start-up). The active window is shown in a visually distinct manner such as in a Different window color, with brighter icons and controls, or bold in the report list in the header. The filter icons ("funnels") are used to apply any filter by clicking on the funnel icon in the report window and implies an "OR Visits where [dimension]=[selected item]" If the user has launched duplicate reports (Browsers, in this example), then numbers are added after the duplicate window names to differentiate them. If the user clicks on any link in the Reports or Filter description section, the applicable window comes into focus (or launches if necessary). If a user clicks on a segment filter element, then the Segment Builder launches or comes into focus. If a user clicks on the date filter text, then the calendar palette launches or comes into focus. If a user clicks on any of the reports listed, then that report comes into focus. Windows don't change size unless the user specifically resizes them. Scrollbars will appear where needed.

FIG. 7O is a graphical representation of an exemplary user interface for reports with the reports menu open. The user can right-click anywhere on the canvas to select the desired report.

FIG. 7P is a graphical representation of an exemplary user interface for the date filter. The Range tab is similar to the standard calendar, except the "Run Report" button text will display "Apply Date".

FIG. 7Q is a graphical representation of an exemplary user interface for the segmentation filter. The "Apply Segment" button applies whatever is currently shown in this palette when selected. So, for example, the user can actually clear any active segment filter by clearing the canvas in the builder and then clicking "Apply Segment".

FIG. 7R is a graphical representation of an exemplary user interface for the metric selector popup window. Any of the applicable option selectors are available within the workbench. For example, the Ranked metric selector is shown. If the Trended view is supported, then the "Select Items to Trend" popup will need to be available, etc.

FIGS. 7S and 7T are a graphical representation of an exemplary user interface for the Save and Open dialogs windows.

FIG. 7U is a graphical representation of an exemplary user interface for the Report window detail.

FIG. 7V is a graphical representation of an exemplary user interface for a pop up window for setting the permissions or define a group. Administrators can create groups that have access to the Segmentation Workbench. In this way, they can control who has access to which report suites for the workbench. Administrators can put certain people in the "concurrent licenses" group, and other people in the "shared cluster" group (assuming that the company has purchased some of both). If the company doesn't have licenses, then the Information Page option is listed.

While the present invention has been described with reference to certain preferred embodiments, those skilled in the art will recognize that various modifications may be provided. For example, back-end servers 402 may have a variety of topologies and arrangements. Variations upon and modifications to the preferred embodiments are provided for by the present invention.

What is claimed is:

1. A system for providing user-customizable analytics data, the system comprising:
  a first computing device comprising a processor and a non-transitory computer readable medium storing an analytics client that, when executed by the processor, is configured to:
    communicate, to an application service provider, default filter criteria comprising one or more preconfigured metrics,
    receiving, from the application service provider, a plurality of analytics reports based on the default filter criteria,
    display the plurality of analytics reports,
    determine one or more modifying filter criteria based on a selection of a user interface element corresponding to a segment of one of the plurality of analytics reports,
    generate one or more queries identifying the one of the plurality of analytics reports and identifying the one or more modifying filter criteria, and
    communicate, to the application service provider, the one or more queries identifying the one of the plurality of analytics reports and identifying the one or more modifying filter criteria associated with the analytics report selected; and
  a second computing device comprising a processor and a non-transitory computer readable medium storing the application service provider, the application service provider including a analytics tool operable to receive the one or more queries identifying the one of the plurality of analytics reports and identifying the one or more modifying filter criteria associated with the analytics report selected, wherein, the application service provider:
    receives the default filter criteria from the analytics client,
    retrieves analytics data based on the default filter criteria and stores the analytics data based on the default filter criteria locally at the second computing device,
    communicates, to the analytics client, the plurality of analytics reports based on the retrieved analytics data, receives the one or more queries from the analytics client, generates, based on the modifying filter criteria and the identified one of the plurality of analytics reports, a custom analytics report, wherein to generate the custom analytics report the modifying filter criteria is applied to the retrieved analytics data associated with the identified one of the plurality of analytics reports,
    wherein the custom analytics report includes less analytics data than is included in the retrieved analytics data, and the custom analytics report is based on the application of modifying filter criteria to the analytics data that was retrieved based on the default filter criteria,
communicate, to the analytics client, the custom analytics report.

2. The system of claim 1, further comprising a second analytics client operable on a computing device to present, to a user, an other plurality of analytics reports, to receive, from another user, one or more other queries indicative of a selection of an other one of the plurality of analytics reports and identifying one or more other modifying filter criteria associated with the other analytics report selected, wherein the other modifying filter criteria is used to modify the default filter criteria of the analytics report selected to create an other custom analytics report based on the other modifying filter criteria, and to communicate, to the application service provider, the one or more other queries indicative of a selection of an other one of the plurality of analytics reports and identifying one or more other modifying filter criteria associated with the other analytics report selected.

3. The system of claim 1,
    wherein the plurality of analytics reports comprises one or more predefined analytics reports,
    wherein at a time a predefined analytics report is selected from a menu, each of the one or more predefined analytics reports is based on one or more default metrics, and
    wherein the one or more default metrics comprise one or more of page views, visits, hourly unique visitors, daily unique visitors, weekly unique visitors, monthly unique visitors, quarterly unique visitors, yearly unique visitors, revenue, orders, units, cart opens, cart adds, cart removes, cart views, or checkouts.

4. The system of claim 1, wherein the application service provider includes a workbench network for storing and providing analytics data, the workbench network responsive to queries from the analytics client.

5. The system of claim 4, further comprising a database storing analytics data, the database coupled to the workbench network to provide analytics data, and wherein the workbench network stores a sampled subset of the analytics data stored in the database.

6. The system of claim 4, further comprising:
    a plurality of front end servers capable of communicating with the analytics client, the front end servers adapted for receiving and servicing queries from the analytics client; and
    a plurality of back end servers capable of communicating with a database and at least two of the plurality of front end servers, the plurality of back end servers adapted for obtaining data from storage, analyzing obtained data, and sending report data.

7. The system of claim 6, wherein the plurality of back end servers filter data based on requests received from the analytics client.

8. The system of claim 1, wherein the analytics client includes a module to generate a report user interface that includes a canvas and selectable filters.

9. The system of claim 8, wherein the filters are one from the group of date filters and segmentation filters.

10. The system of claim 8, wherein the filters are customizable by the user.

11. The system of claim 1, wherein the one or more modifying filter criteria is narrower than the default filter criteria, and wherein the application service provider applies the one or more modifying filter criteria to the analytics data stored locally without retrieving additional analytics data from a database.

12. The system of claim 1, wherein, in response to receiving one or more additional queries identifying additional modifying filter criteria that is broader than the default filter criteria, the application service provider is adapted to retrieve, from a database, additional analytics data based on the additional modifying filter criteria.

13. One or more computing devices for providing user customizable analytics data, the one or more computing devices comprising:
    at least one processor and non-transitory computer readable medium storing an application service provider including an analytics tool operable to receive one or more queries identifying one of a plurality of analytics reports and identifying one or more modifying filter criteria associated with the identified analytics report,
    wherein the application service provider:
        receives default filter criteria from an analytics client, wherein the default filter criteria comprises one or more preconfigured metrics,
        retrieves analytics data based on the default filter criteria and stores the analytics data based on the default filter criteria locally at the computing device,
        communicates, to the analytics client, the plurality of analytics reports based on the retrieved analytics data, wherein the analytics client displays the plurality of analytics reports,
        receives the one or more queries from the analytics client, wherein the one or more queries identify the one of the plurality of analytics reports and identify the one or more modifying filter criteria, wherein the modifying filter criteria is based on a selection at the analytics client of a user interface element corresponding to a segment of the identified one of the plurality of analytics reports,
        generates, based on the modifying filter criteria and the identified one of the plurality of analytics reports, a custom analytics report, wherein to generate the custom analytics report the modifying filter criteria is applied to the retrieved analytics data associated with the identified one of the plurality of analytics reports,
        wherein the custom analytics report includes less analytics data than is included in the retrieved analytics data, and the custom analytics report is based on the application of modifying filter criteria to the analytics data that was retrieved based on the default filter criteria,
        communicate, to the analytics client, the custom analytics report.

14. The one or more computing devices of claim 13 wherein the application service provider operates on a computing device, and wherein the application service provider is adapted to communicate with one or more analytics client devices over a network.

15. The one or more computing devices of claim 13, wherein the application service provider includes a workbench network for storing and providing analytics data, the workbench network responsive to queries from client devices.

16. The one or more computing devices of claim 15 further comprising a database storing analytics data, the database coupled to the workbench network to provide analytics data, and wherein the workbench network stores a sampled subset of the analytics data stored in the database.

17. The one or more computing devices of claim 15, further comprising:
 a plurality of front end servers capable of communicating with the client device, the front end servers adapted for receiving and servicing queries from the client device; and
 a plurality of back end servers capable of communicating with a database and at least two of the plurality of front end servers, the plurality of back end servers adapted for obtaining data from storage, analyzing obtained data, and sending report data.

18. The one or more computing devices of claim 17, wherein the plurality of back end servers filter data based on requests received from the client device.

19. The one or more computing devices of claim 15, wherein the one or more modifying filter criteria is narrower than the default filter criteria, and wherein the application service provider applies the one or more modifying filter criteria to the analytics data stored locally without retrieving additional analytics data from a database.

20. The one or more computing devices of claim 15, wherein, in response to receiving one or more additional queries identifying additional modifying filter criteria that is broader than the default filter criteria, the application service provider is adapted to retrieve, from a database, additional analytics data based on the additional modifying filter criteria.

21. A method for providing user-customizable analytics data to an analytics client device by an analytics application service provider, the method comprising:
 establishing a communication connection between the analytics client device and the analytics application service provider;
 receiving, by the analytics application service provider, default filter criteria from the analytics client device, wherein the default filter criteria comprises one or more preconfigured metrics;
 retrieving, by the analytics application service provider, analytics data based on the default filter criteria and storing the analytics data locally at the analytics application service provider;
 communicating, to the analytics client, the plurality of analytics reports based on the retrieved analytics data, wherein the analytics client displays the plurality of analytics reports;
 receiving one or more queries from the analytics client, wherein the one or more queries identify one of the plurality of analytics reports and identify one or more modifying filter criteria, wherein the modifying filter criteria is based on a selection at the analytics client of a user interface element corresponding to a segment of the one of the plurality of analytics reports;
 generating, based on the modifying filter criteria and the identified one of the plurality of analytics reports, a custom analytics report, wherein generating the custom analytics report comprises applying the modifying filter criteria to the retrieved analytics data associated with the identified one of the plurality of analytics reports,
 wherein the custom analytics report includes less analytics data than is included in the retrieved analytics data, and the custom analytics report is based on the application of modifying filter criteria to the analytics data that was retrieved based on the default filter criteria,
 communicating, to the analytics client, the custom analytics report.

22. The method of claim 21 wherein establishing a communication connection between the analytics client device and the analytics application service provider comprises a user logging into the analytics application service provider, and verifying a license associated with the analytics client device.

23. The method of claim 21 wherein generating the filtered analytics data comprises loading analytics data that was previously stored in the analytics application service provider.

24. The method of claim 21 wherein retrieving the analytics data based on the default filter criteria from a remote storage location and loading the analytics data locally onto the analytics application service provider comprises sampling analytics data from a database and storing the sampled data on a server upon which the analytics application service provider operates.

25. The method of claim 21 wherein the step of providing the filtered analytics data to the client device includes providing a custom report for displaying the filtered data.

26. The method of claim 25 wherein the custom report is a canvas capable of displaying a plurality of filtered data sets.

27. The method of claim 21 further comprising:
 applying additional modifying filter criteria to the filtered analytics data, the additional modifying filter criteria having been received from the analytics client device;
 generating updated analytics data based on the additional modifying filter criteria; and
 providing the updated analytics data to the client device.

28. The method of claim 21, wherein the modifying filter criteria that is narrower than the default filter criteria, and wherein generating filtered analytics data comprises the analytics service provider applying the modified filter criteria to the analytics data loaded locally on the analytics application service provider without retrieving additional analytics data from a remote storage location.

29. The method of claim 21, wherein, in response to receiving one or more additional queries identifying additional modified filter criteria that is broader than the default filter criteria, the application service provider is adapted to retrieve, from a remote storage location, additional analytics data based on the additional modified filter criteria.

* * * * *